(12) United States Patent
Karczmar et al.

(10) Patent No.: US 9,972,089 B2
(45) Date of Patent: May 15, 2018

(54) CONTRAST MEDIUM UPTAKE TIME COMPUTATION USING MAGNETIC RESONANCE IMAGING

(71) Applicant: The University of Chicago, Chicago, IL (US)

(72) Inventors: Gregory S. Karczmar, Crete, IL (US); Federico D. Pineda, Chicago, IL (US); Gillian M. Newstead, Winter Harbor, ME (US); Shiyang Wang, Chicago, IL (US); Aytekin Oto, Chicago, IL (US); Xiaobing Fan, Darien, IL (US); Hiroyuki Abe, Chicago, IL (US)

(73) Assignee: The University of Chicago, Chicago, IL (US)

(*) Notice: Subject to any disclaimer, the term of this patent is extended or adjusted under 35 U.S.C. 154(b) by 0 days. days.

(21) Appl. No.: 15/248,445

(22) Filed: Aug. 26, 2016

(65) Prior Publication Data
US 2017/0061613 A1    Mar. 2, 2017

Related U.S. Application Data

(60) Provisional application No. 62/210,016, filed on Aug. 26, 2015.

(51) Int. Cl.
*G06K 9/00*    (2006.01)
*G06T 7/00*    (2017.01)

(52) U.S. Cl.
CPC .. *G06T 7/0016* (2013.01); *G06T 2207/10096* (2013.01); *G06T 2207/30068* (2013.01); *G06T 2207/30104* (2013.01)

(58) Field of Classification Search
CPC ............. G06T 7/0016; G06T 7/0012; G06T 2207/10088; G06T 2207/30068; G06T 2207/30101; G06T 2207/10096; G06T 2207/30104
See application file for complete search history.

(56) References Cited

U.S. PATENT DOCUMENTS

2006/0018548 A1* 1/2006 Chen ............... G06T 7/0012
                                                        382/190
2010/0066756 A1* 3/2010 Yang ............... A61B 6/481
                                                        345/593

(Continued)

*Primary Examiner* — Yon Couso
(74) *Attorney, Agent, or Firm* — Bell & Manning, LLC

(57) ABSTRACT

A computing device determines a contrast medium uptake time using magnetic resonance imaging data. Image data constructed from data generated by a magnetic resonance imaging (MRI) machine of a subject is read. A representation computed from the read image data is presented on a display device. Baseline artery locations identified within the presented representation that are associated with a baseline artery are received. A first time-of-arrival (TOA) of contrast medium into the baseline artery is determined using the received baseline artery locations and the read image data. For a plurality of locations within the read image data excluding the baseline artery locations, a second TOA of the contrast medium into a respective location relative to the determined first TOA is determined using the read image data, and the determined second TOA is stored in association with the respective location to assist in lesion identification for the subject.

20 Claims, 24 Drawing Sheets

(56) References Cited

U.S. PATENT DOCUMENTS

2013/0200900 A1* 8/2013 Buurman ............... G01R 33/50
324/322
2016/0058407 A1* 3/2016 Wakai .................. A61B 6/5217
382/103
2016/0296286 A1* 10/2016 Bai ..................... G06F 19/3437

* cited by examiner

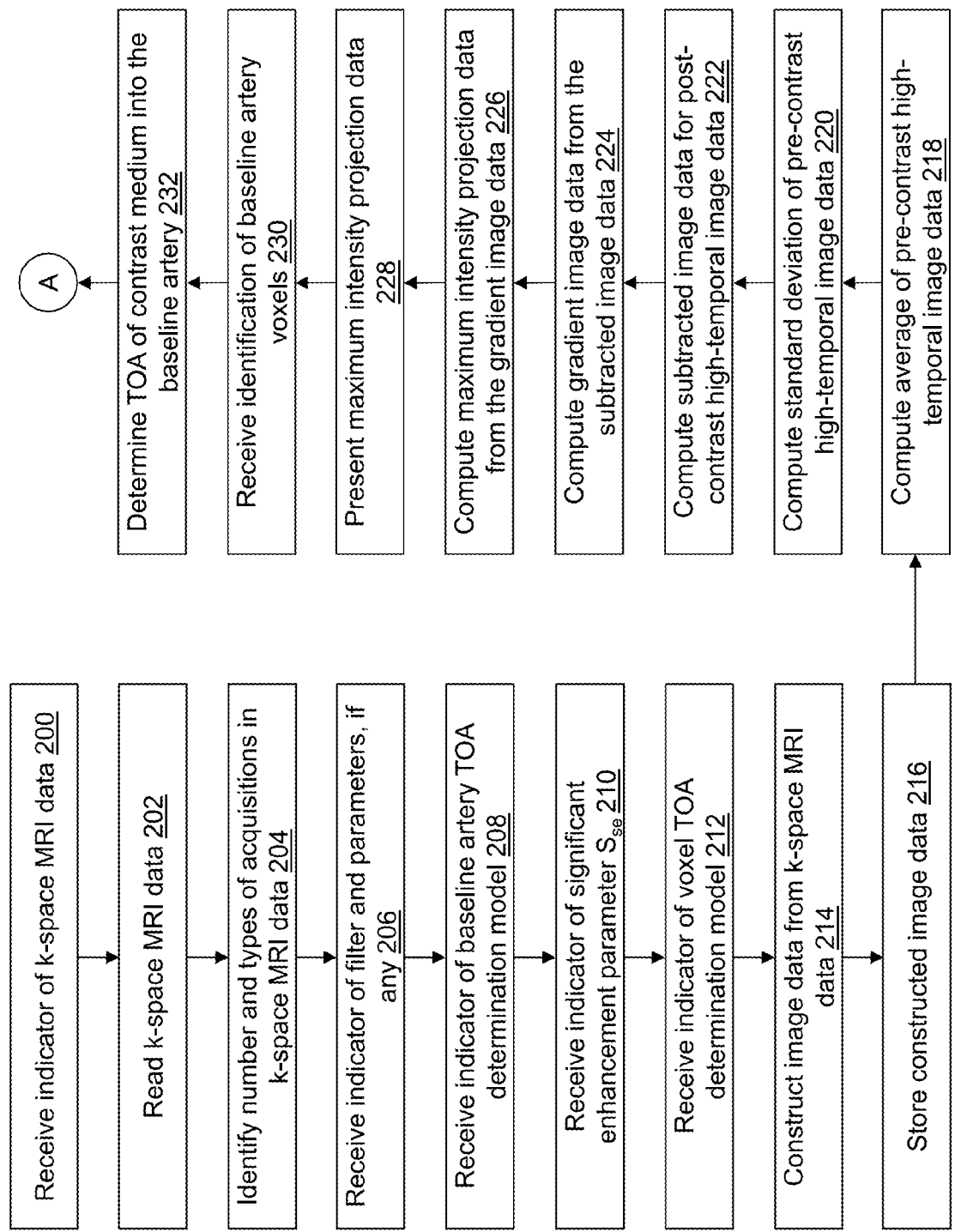

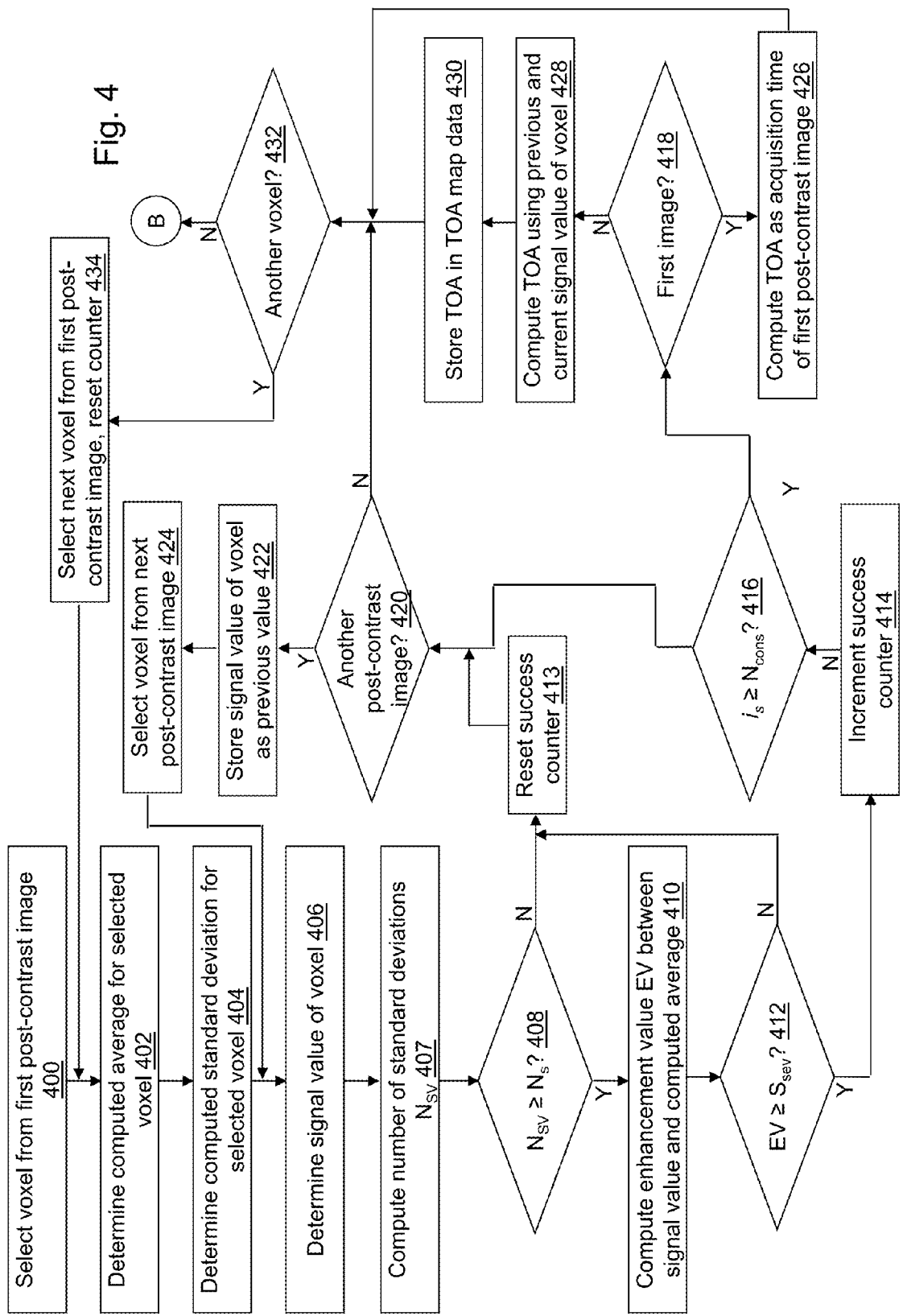

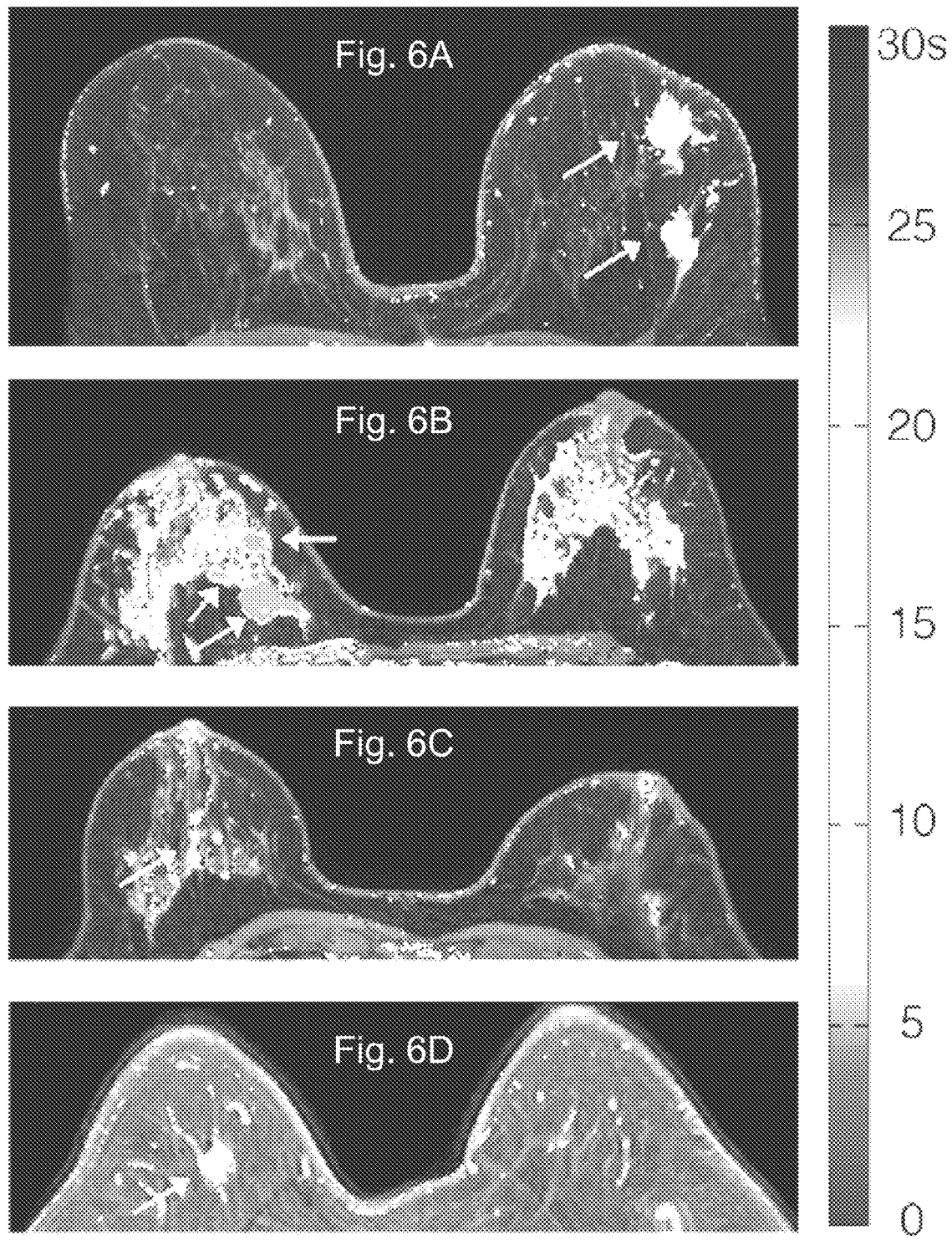

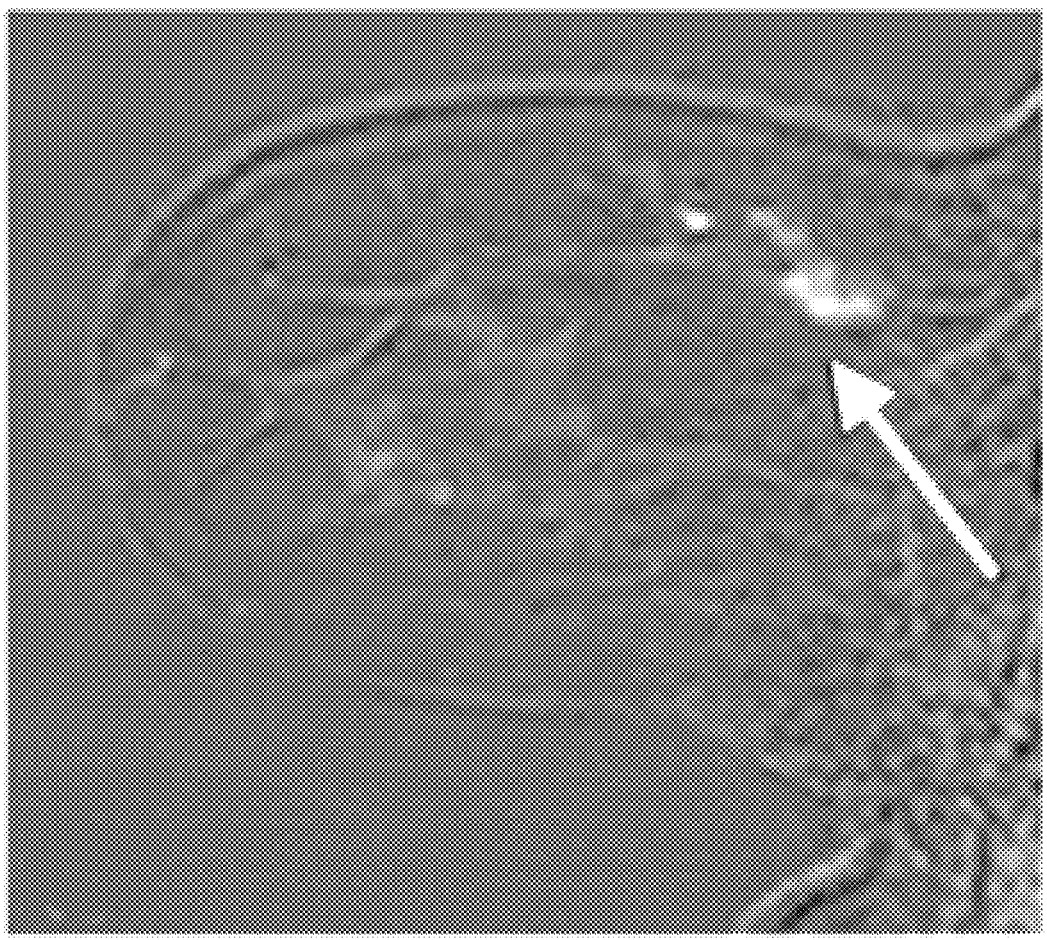

CONTRAST MEDIUM UPTAKE TIME COMPUTATION USING MAGNETIC RESONANCE IMAGING

CROSS-REFERENCE TO RELATED APPLICATIONS

The present application claims the benefit of 35 U.S.C. § 119(e) to U.S. Provisional Patent Application No. 62/210,016 filed on Aug. 26, 2015, the entire contents of which is hereby incorporated by reference.

BACKGROUND

Dynamic contrast-enhanced (DCE) magnetic resonance imaging (MRI) (DCE-MRI) of tissue, such as breast or prostate tissue, is a valuable tool for the detection and diagnosis of health issues including cancer. For example, the kinetics of contrast medium uptake and washout yield important markers for malignancy. Typically, malignant tumors exhibit fast uptake of contrast medium followed by washout in a later phase. Standard clinical contrast enhanced scans are generally performed with high-spatial resolution to enable morphological evaluation of lesions and detection of small cancers. The high-spatial resolution required, combined with the sometimes large fields-of-view necessary to acquire images, leads to low temporal resolution, typically in the range of 60 to 75 seconds (s). As a result, important kinetic information is obscured.

Acquiring DCE-MRI with high-temporal resolution is important as it allows accurate classification of contrast medium dynamics in suspicious lesions, and thus, has the potential to aid discrimination between malignant and benign lesions. In addition, high-temporal resolution allows accurate measurement of the arterial input function (AIF) for each patient, a critical step in quantitative pharmacokinetic analysis.

SUMMARY

In an example embodiment, a non-transitory computer-readable medium is provided having stored thereon computer-readable instructions that, when executed by a computing device, cause the computing device to determine a contrast medium uptake time using magnetic resonance imaging data. A computing device determines a contrast medium uptake time using magnetic resonance imaging data. Image data constructed from data generated by a magnetic resonance imaging (MRI) machine of a subject is read. A representation computed from the read image data is presented on a display device. Baseline artery locations identified within the presented representation that are associated with a baseline artery are received. A first time-of-arrival (TOA) of contrast medium into the baseline artery is determined using the received baseline artery locations and the read image data. For a plurality of locations within the read image data excluding the baseline artery locations, a second TOA of the contrast medium into a respective location relative to the determined first TOA is determined using the read image data, and the determined second TOA is stored in association with the respective location to assist in lesion identification for the subject.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to determine a contrast medium uptake time using magnetic resonance imaging data.

In an example embodiment, a method of determining a contrast medium uptake time using magnetic resonance imaging data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, 3, and 4 depict a flow diagram illustrating examples of operations performed by the MRI data processing device of FIG. 1 in accordance with an illustrative embodiment.

FIGS. 6A-6D depict time-of-arrival (TOA) maps computed by the MRI data processing device of FIG. 1 for both malignant and benign lesions in accordance with an illustrative embodiment.

FIGS. 9A-9H depict subtracted image data for three ultrafast time-points and a first time-point of a standard clinical protocol computed by the MRI data processing device of FIG. 1 for two of the cases shown in FIG. 8 in accordance with an illustrative embodiment.

DETAILED DESCRIPTION

Figure 1:
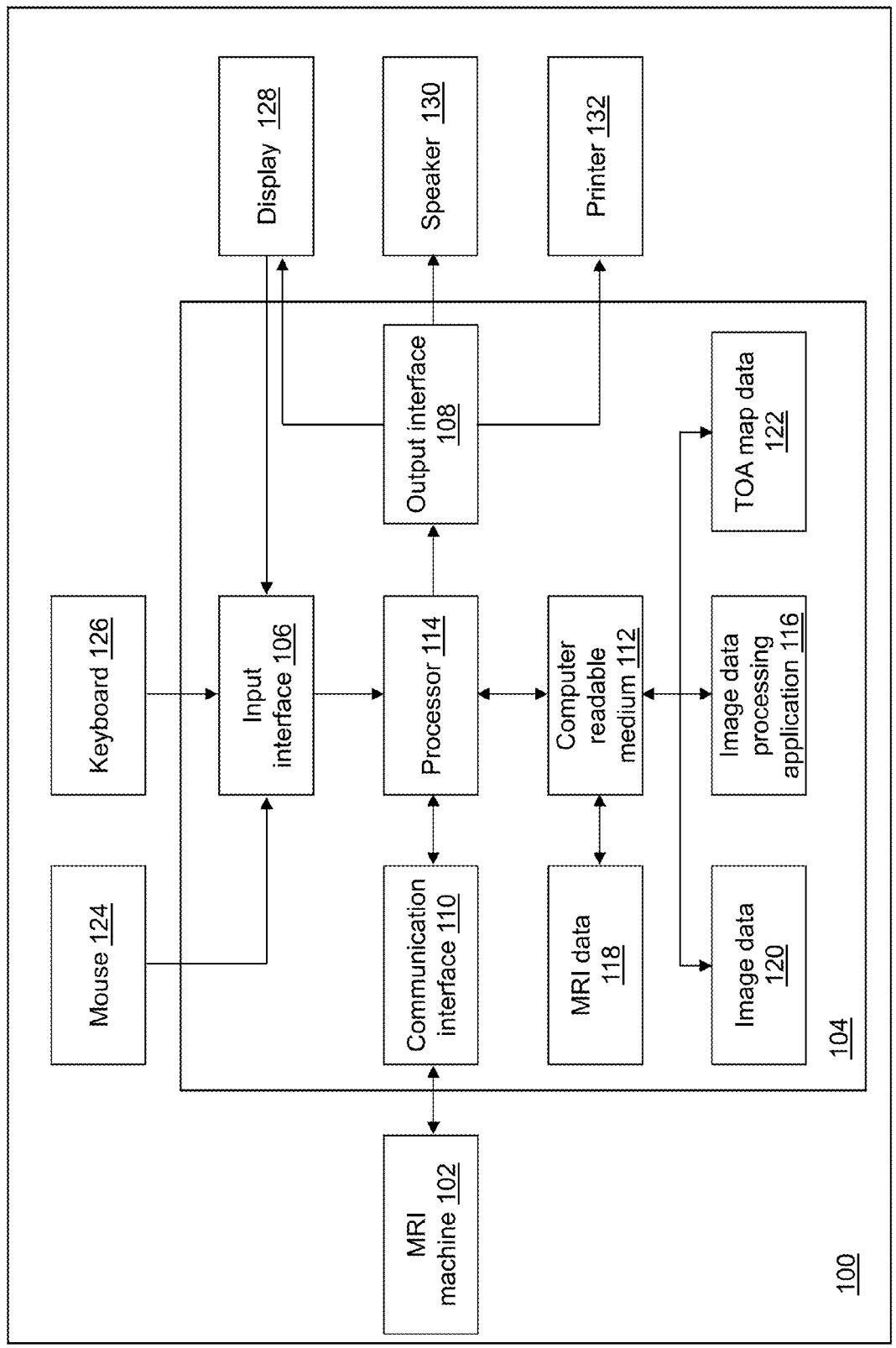
FIG. 1 depicts a block diagram of a magnetic resonance imaging (MRI) data processing device in accordance with an illustrative embodiment.

Magnetic resonance imaging (MRI) is an important diagnostic and imaging technique. MRI techniques are based on the absorption and emission of radio frequency (RF) energy by the nuclei of atoms. Typically, a target is placed in a strong magnetic field that causes the generally disordered and randomly oriented nuclear spins of the atoms to become aligned with the applied magnetic field. One or more RF pulses are transmitted into the target, perturbing the nuclear spins. As the nuclear spins relax to their aligned state, the nuclei emit RF energy that is detected by receiving coils disposed about the target. The received RF energy is processed into a magnetic resonance image of a portion of the target.

By utilizing non-uniform magnetic fields having gradients in each of three spatial dimensions, the location of the emitting nuclei can be spatially encoded so that the target can be imaged in three dimensions (3-D). The three dimensions are commonly two mutually orthogonal directions x and y defined in a plane denoted as a "slice" with a series of slices defined in a third mutually orthogonal direction z. As used herein, the x-direction is associated with a frequency-encoding (FE) direction, and the y-direction is associated with a phase-encoding (PE) direction. Generally, RF pulses having a range of frequencies are transmitted into the target, and through use of well-known frequency encoding (e.g., for the x-direction) and phase encoding techniques (e.g., for the y-direction), a set of MRI data is received by each of the receiver coils for each slice in the target.

MRI data provides a representation of the MRI image in the frequency domain, often called k-space domain, where $k_x$ and $k_y$ are the spatial frequency variables in the x and y directions having units of cycles per unit distance. An image of the slice of the target is obtained by performing an inverse Fourier transformation of the k-space MRI data. In MRI systems having multiple receiver coils (parallel MRI), an image is reconstructed from each receiver coil, and a final image is a combination of the images from each coil. Multiple receiver coil systems can be used to achieve high-spatial and temporal resolution, to suppress image artifacts, and to reduce MRI scan time.

MRI data can be acquired at the appropriate Nyquist sampling rate to avoid artifacts in the final image caused by aliasing. However, sampling at the Nyquist rate is time consuming, which can prevent the imaging of targets that move, such as a beating heart. To decrease scan time, parallel imaging can be used to exploit a difference in sensitivities between individual coil elements in a receiver array to reduce the total number of PE views that are acquired. A "view" constitutes all of the $k_x$ measurements for a single $k_y$. For the simplest case, a reduction also known as an acceleration factor of two, the even or odd PE views are skipped relative to the fully sampled k-space.

Skipping every other line of k-space increases the distance of equidistantly sampled k-space lines. If the maximum $k_y$ is unchanged to maintain resolution, an aliased image may be generated from the k-space data. The reduction in the number of PE steps relative to the Nyquist sampling rate is known as undersampling and is characterized by a reduction factor, R. The various undersampling strategies can be divided into two groups, uniform undersampling and non-uniform undersampling. Uniform undersampling uses the equidistantly spaced distributed PE and causes aliasing in the reconstructed image. Non-uniform undersampling, also called variable-density undersampling, generally more densely samples a central region of k-space, and more sparsely samples an outer region. Parallel MRI (P-MRI) undersamples, as compared to the Nyquist sampling rate, by the reduction factor R, which may be 2 or more, to decrease the data acquisition time. The undersampling results in certain data in k-space not being acquired, and therefore not available for image reconstruction. However, dissimilarities in the spatial sensitivities of the multiple receiver coils provide supplementary spatial encoding information, which is known as "sensitivity encoding." A fully sampled set of k-space MRI data can be produced by combining the undersampled, sensitivity-encoded MRI data received by different coils with reconstructed values for the unacquired data to create an image with removed aliasing artifacts.

Coil sensitivities can be used to reconstruct the full field-of-view (FOV) image in the image space domain or in the k-space domain as known to those skilled in the art. In sensitivity encoding (SENSE) reconstruction, coil sensitivity estimates determined from reference scans are applied to reconstruct images from subsequent scans in the image space domain.

Referring to FIG. 1, a block diagram of a magnetic resonance imaging (MRI) data processing system 100 is shown in accordance with an illustrative embodiment. For example, MRI data processing system 100 may be used to perform dynamic contrast-enhanced (DCE) MRI (DCE-MRI) of a subject that, for example, may be a human or an animal. In an illustrative embodiment, MRI data processing system 100 may include MRI machine 102 and an MRI data processing device 104. MRI machine 102 generates MRI image data in the k-space domain that is post-processed by MRI data processing device 104. MRI data processing device 104 may be a computing device of any form factor. Different and additional components may be incorporated into MRI data processing device 104. Components of MRI data processing system 100 may be co-located in the same room or same facility or may be remote from one another.

MRI machine 102 and MRI data processing device 104 may be integrated into a single system. MRI machine 102 and MRI data processing device 104 may be directly connected. For example, MRI machine 102 may connect to MRI data processing device 104 using a cable for transmitting information between MRI machine 102 and MRI data processing device 104. MRI machine 102 may connect to MRI data processing device 104 using a network. MRI images may be stored electronically and accessed using MRI data processing device 104. MRI machine 102 and MRI data processing device 104 may not be connected. Instead, the MRI data acquired using MRI machine 102 may be manually provided to MRI data processing device 104. For example, the MRI data may be stored on a computer-readable medium 112 such as a compact disc (CD) or digital versatile disc (DVD). After receiving the MRI data, MRI data processing device 104 may initiate processing of the set of images that comprise an MRI study. In an illustrative embodiment, MRI machine 102 is an Achieva 3T-TX MRI scanner manufactured by Philips Healthcare, Best, Netherlands. MRI machines of a different type, manufacture, and model may be used in alternative embodiments without limitation.

MRI data processing device 104 may include an input interface 106, an output interface 108, a communication interface 110, computer-readable medium 112, a processor 114, an image data processing application 116, MRI data 118, image data 120, and time-of-arrival (TOA) map data 122. Fewer, different, and additional components may be incorporated into MRI data processing device 104.

Input interface 106 provides an interface for receiving information from the user for entry into MRI data processing device 104 as understood by those skilled in the art. Input interface 106 may interface with various input technologies including, but not limited to, a keyboard 126, a mouse 124, a display 128, a track ball, a keypad, one or more buttons, etc. to allow the user to enter information into MRI data processing device 104 or to make selections presented in a user interface displayed on display 124. The same interface may support both input interface 106 and output interface 108. For example, display 128 comprising a touch screen both allows user input and presents output to the user. MRI data processing device 104 may have one or more input interfaces that use the same or a different input interface technology. The input interface technology further may be accessible by MRI data processing device 104 through communication interface 110.

Output interface 108 provides an interface for outputting information for review by a user of MRI data processing device 104. For example, output interface 108 may interface with various output technologies including, but not limited to, display 128, a speaker 130, a printer 132, etc. MRI data processing device 104 may have one or more output interfaces that use the same or a different interface technology. The output interface technology further may be accessible by MRI data processing device 104 through communication interface 110.

Communication interface 110 provides an interface for receiving and transmitting data between devices using various protocols, transmission technologies, and media as understood by those skilled in the art. Communication interface 110 may support communication using various transmission media that may be wired and/or wireless. MRI data processing device 104 may have one or more communication interfaces that use the same or a different communication interface technology. For example, MRI data processing device 104 may support communication using an Ethernet port, a Bluetooth antenna, a telephone jack, a USB port, etc. Data and messages may be transferred between MRI data processing device 104 and MRI machine 102 using communication interface 110.

Computer-readable medium 112 is an electronic holding place or storage for information so the information can be accessed by processor 114 as understood by those skilled in the art. Computer-readable medium 112 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. MRI data processing device 104 may have one or more computer-readable media that use the same or a different memory media technology. MRI data processing device 104 also may have one or more drives that support the loading of a memory media such as a CD or DVD, an external hard drive, etc. One or more external hard drives further may be connected to MRI data processing device 104 using communication interface 110.

Processor 114 executes instructions as understood by those skilled in the art. The instructions may be carried out by a special purpose computer, logic circuits, or hardware circuits. Processor 114 may be implemented in hardware and/or firmware. Processor 114 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 114 operably couples with input interface 106, with output interface 108, with communication interface 110, and with computer-readable medium 112 to receive, to send, and to process information. Processor 114 may retrieve a set of instructions from a permanent memory device and copy the instructions in an executable form to a temporary memory device that is generally some form of RAM. MRI data processing device 104 may include a plurality of processors that use the same or a different processing technology.

Image data processing application 116 performs operations associated with processing MRI data 118 using any of the methods or method steps described herein. The operations may be implemented using hardware, firmware, software, or any combination of these methods. Referring to the example embodiment of FIG. 1, image data processing application 116 is implemented in software (comprised of computer-readable and/or computer-executable instructions) stored in computer-readable medium 112 and accessible by processor 114 for execution of the instructions that embody the operations of image data processing application 116. Image data processing application 116 may be written using one or more programming languages, assembly languages, scripting languages, etc.

Image data processing application 116 may be implemented as a Web application. For example, image data processing application 116 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

MRI data 118 provides a representation of an MRI image in the frequency domain, often called k-space domain, where $k_y$ and $k_z$ are the spatial frequency variables in the y and z directions having units of cycles per unit distance. An image of a slice of a target is obtained by performing an inverse Fourier transformation of the k-space MRI data. In MRI systems having multiple receiver coils (parallel MRI), an image is reconstructed from each receiver coil, and a final image is a combination of the images from each coil.

Referring to FIGS. 2A, 2B, 3, and 4, example operations performed by image data processing application 116 are described. Additional, fewer, or different operations may be performed depending on the embodiment of image data processing application 116. The order of presentation of the operations of FIGS. 2A, 2B, 3, and 4 is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute image data processing application 116, which causes presentation of a first user interface window, which may include a plurality of menus and selectors such as drop down menus, buttons, text boxes, hyperlinks, etc. associated with image data processing application 116 as understood by a person of skill in the art. The plurality of menus and selectors may be accessed in various orders. An indicator may indicate one or more user selections from a user interface, one or more data entries into a data field of the user interface, one or more data items read from computer-readable medium 112 or otherwise defined with one or more default values, etc. that are received as an input by image data processing application 116.

Referring to FIG. 2A, in an operation 200, a first indicator may be received that indicates MRI data 118. For example, the first indicator indicates a location and a name of MRI data 118. As an example, the first indicator may be received by image data processing application 116 after selection from a user interface window or after entry by a user into a user interface window. In an alternative embodiment, MRI data 118 may not be selectable. For example, a most-recently created dataset may be used automatically. As another example, a default location and name may be stored and used for MRI data 118. The first indicator may indicate a plurality of datasets.

In an operation 202, k-space data may be read from MRI data 118 indicated by the first indicator.

In an operation 204, a number and a type of each acquisition included in the read k-space data may be identified. For example, MRI data 118 may include values that define the number and the type of each acquisition included in the read k-space data. As another example, a user may enter the number and the type of each acquisition through the user interface window or may define the number and the type of each acquisition in another input file. Each acquisition is associated with 3-D MRI k-space data captured over a pre-defined FOV. The FOV may be defined to image a predefined area of body tissue such as a breast region, a prostate region, etc.

For illustration, the number and type of acquisitions may define a first number of pre-contrast medium, high-spatial resolution acquisitions, a second number of pre-contrast medium, high-temporal resolution acquisitions, a third number of post-contrast medium, high-spatial resolution acquisitions, and a fourth number of post-contrast medium, high-temporal resolution acquisitions. Each high-temporal resolution acquisition is captured faster than each high-spatial resolution acquisition; whereas, each high-spatial resolution acquisition is captured with more precise spatial detail than each high-temporal resolution acquisition.

The first number of pre-contrast medium, high-spatial resolution acquisitions may include data for one or more acquisitions of 3-D MRI k-space data generated before injection of the contrast medium. The second number of pre-contrast medium, high-temporal resolution acquisitions may include data for a plurality of acquisitions of 3-D MRI k-space data generated before injection of the contrast medium. The third number of post-contrast medium, high-temporal resolution acquisitions may include data for a plurality of acquisitions of 3-D MRI k-space data generated after injection of the contrast medium. The fourth number of post-contrast medium, high-spatial resolution acquisitions may include data for one or more acquisitions of 3-D MRI k-space data generated after injection of the contrast medium and after the third number of post-contrast medium, high-temporal resolution acquisitions.

For example, a high-temporal resolution acquisition may be acquired five to sixty (or more) times faster than each high-spatial resolution acquisition, and a high-spatial resolution acquisition may have ten to twenty times greater spatial resolution than each high-temporal resolution acquisition. In an illustrative embodiment, a high-temporal resolution is captured at a rate of one to ten seconds per image; whereas, a high-spatial resolution acquisition is captured at a rate of 40 to 120 seconds per image.

In an operation 206, a second indicator of a filter to apply may be received with values of any parameters that may be used to control, effect, or otherwise define execution of the indicated filter. The filter defines conditions to satisfy to determine whether or not a voxel becomes "significantly" enhanced. In an alternative embodiment, no filter may be indicated. The values of any parameters that define the conditions implemented by the filter may be received separately or may be defined using default values. For example, the second indicator indicates a name of the filter. As another example, the second indicator indicates which, if any, of a plurality of listed conditions are implemented by the filter. The second indicator may be received by image data processing application 116 after selection from a user interface window or after entry by a user into a user interface window. A default value for the filter may further be stored, for example, in computer-readable medium 112. As an example, the filter may be selected from "None", "Deviation Only", "Signal Increase Only", "Deviation and Signal Increase", etc. A deviation value $N_\sigma$ may be indicated when "Deviation Only" or "Deviation and Signal Increase" are indicated. An enhancement value $S_{sev}$ may be indicated when "Signal Increase Only" or "Deviation and Signal Increase" are indicated. The value $S_{sev}$ may be greater than or equal to zero. A number of consecutive successful test values $N_{cons}$ may be indicated when any of "Deviation Only", "Signal Increase Only", or "Deviation and Signal Increase" is indicated. The value $N_{cons}$ may default to one.

Of course, the filter may be labeled or selected in a variety of different manners by the user as understood by a person of skill in the art. In an alternative embodiment, the filter may not be selectable, and a single filter is implemented by image data processing application 116. For illustration, a default filter may be "Deviation and Signal Increase". The "Deviation and Signal Increase" filter may be used by default or without allowing a user selection. For additional illustration, a default filter may be "None" such that no filter is applied to each voxel.

As understood by a person of skill in the art, a voxel defines a point in three-dimensional space; whereas, a pixel defines a point in two-dimensional space. Though image data processing application 116 is described as processing a plurality of voxels that have MRI signal values defined for each 3-D location, image data processing application 116 may also process a plurality of pixels that have MRI signal values defined for each 2-D location. For example, a single slice of MRI data could be processed instead of a plurality of slices to define a 3-D space.

In an operation 208, a third indicator of a baseline artery TOA determination model to apply may be received with values of any parameters that may be used to control, effect, or otherwise define execution of the indicated model. The model defines a method for determining a TOA of contrast medium into the baseline artery where the contrast medium was injected into a subject for which MRI data 118 is obtained. The baseline artery may vary based on the body part imaged. For example, when a breast region is imaged, the baseline artery is an internal mammary artery.

The values of any parameters that define the baseline artery TOA determination model may be received separately or may be defined using default values. For example, the third indicator indicates a name of the baseline artery TOA determination model. The third indicator may be received by image data processing application 116 after selection from a user interface window or after entry by a user into a user interface window. A default value for the baseline artery TOA determination model may further be stored, for example, in computer-readable medium 112. As an example, the baseline artery TOA determination model may be selected from "Linear interpolation", "Spline interpolation", "Polynomial interpolation", "Arterial Input Function Model", etc. The "Arterial Input Function Model" baseline artery TOA determination model may define a fit to the arterial enhancement as a function of time that describes the arterial input function.

Of course, the baseline artery TOA determination model may be labeled or selected in a variety of different manners by the user as understood by a person of skill in the art. In an alternative embodiment, the baseline artery TOA determination model may not be selectable, and a single baseline artery TOA determination model is implemented by image data processing application 116. For illustration, a default baseline artery TOA determination model may be "Linear interpolation". The "Linear interpolation" model may be used by default or without allowing a user selection.

In an operation 210, a fourth indicator of a significant enhancement parameter may be received. The fourth indicator indicates a value $S_{se}$ of the significant enhancement parameter. The value $S_{se}$ may be between zero and one inclusive. The value of the significant enhancement parameter may be used to determine when the baseline artery is identified as "significantly enhanced". In an alternative embodiment, the fourth indicator may not be received and/or selectable. For example, a default value may be stored, for example, in computer-readable medium 112 and used automatically.

In an operation 212, a fifth indicator of a voxel TOA determination model to apply may be received with values of any parameters that may be used to control, effect, or otherwise define execution of the indicated model. The voxel TOA determination model defines a method for determining a TOA of the contrast medium by the voxel. The voxel TOA determination model is based on data points that describe a signal intensity as a function of acquisition time. The values of any parameters that define the voxel TOA determination model may be received separately or may be defined using default values. For example, the fifth indicator indicates a name of the voxel TOA determination model. The fifth indicator may be received by image data processing application 116 after selection from a user interface window or after entry by a user into a user interface window. A default value for the voxel TOA determination model may further be stored, for example, in computer-readable medium 112. As an example, the voxel TOA determination model may be selected from "Linear interpolation", "Spline interpolation", "Polynomial interpolation", "Linear curve fit", "Exponential curve fit", "Polynomial curve fit", etc. The voxel TOA determination model and the baseline artery TOA determination model may be the same such that only one of the third indicator or the fifth indicator is received in an alternative embodiment.

Of course, the voxel TOA determination model may be labeled or selected in a variety of different manners by the user as understood by a person of skill in the art. In an alternative embodiment, the voxel TOA determination model may not be selectable, and a single voxel TOA determination model is implemented by image data processing application 116. For illustration, a default voxel TOA determination model may be "Linear interpolation". The "Linear interpolation" model may be used by default or without allowing a user selection.

In an operation 214, image data may be constructed from MRI data 118. MRI data 118 may be processed to reconstruct missing k-space data points as a result of using an acceleration factor greater than one. For example, the image data may be constructed using an inverse Fourier transform applied to MRI data 118 including missing k-space data points. As understood by a person of skill in the art, the image data is configured to create an image for presentation to a user, for example, using display 128.

In an operation 216, the constructed image data may be stored, for example, in computer-readable medium 112 as image data 120.

In an operation 218, baseline image data may be computed from image data 120 as an average of each signal value for each voxel of the pre-contrast high-temporal acquisitions indicated in operation 204.

In an operation 220, deviation image data may be computed from image data 120 as a standard deviation between signal values of each voxel of the pre-contrast high-temporal acquisitions indicated in operation 204 relative to the baseline image data computed for each voxel in operation 218.

In an operation 222, subtracted image data may be computed from image data 120 for each signal value of each voxel of the post-contrast high-temporal acquisitions indicated in operation 204 using the baseline image data computed for each voxel in operation 218. For example, the signal value of each voxel of the baseline image data is subtracted from the corresponding signal value of each voxel of each post-contrast high-temporal acquisition.

In an operation 224, gradient image data may be computed between each image and its immediately preceding image of the subtracted image data. For example, the signal value of each voxel of the subtracted image data for a second post-contrast high-temporal acquisition is subtracted from the corresponding signal value of each voxel of subtracted image data for a first post-contrast high-temporal acquisition to define a first gradient image data. For illustration, when there are 10 post-contrast high-temporal acquisitions, the gradient image data includes data for nine gradient images (2-1, 3-2, 4-3, 5-4, 6-5, 7-6, 8-7, 9-8, 10-9). In an alternative embodiment, the gradient image data may be computed using the constructed image data.

In an operation 226, maximum intensity projection data may be computed from the gradient image data to visualize an entire volume in 3-D at each time-point. In addition, or in the alternative, maximum intensity projection data may be computed from the subtracted image data and/or the constructed image data. For illustration, a paper, J. W. Wallis and T. R. Miller, *Three-dimensional display in nuclear medicine*. IEEE Transactions on Medical Imaging, Volume 8, Issue 4, 297-330 (1989), describes maximum activity projections also known as maximum intensity projection.

In an operation 228, the maximum intensity projection data may be presented to a user such as a clinician or radiologist using display 128. In an alternative embodiment, a different representation of the constructed image data may be presented. For example, the gradient image data, the subtracted image data, and/or the constructed image data may be presented. Where the gradient image data, the subtracted image data, and/or the constructed image data represent 3-D data, the presentation may support a user selection of a slice to present and/or a user sequencing through a plurality of slices.

DCE-MRI studies were performed using a Philips Achieva 3T-TX MRI scanner (Philips Healthcare, Best, The Netherlands) using a 16-channel bilateral breast coil (MammoTrak, Philips Healthcare) to capture MRI data 118. For illustration, FIGS. 5A-5D depict maximum intensity projections of the subtracted image data, and FIGS. 5E-5H depict maximum intensity projections of the gradient image data computed using the acquisition parameters for the high-temporal resolution acquisitions and the high-spatial resolution acquisitions summarized in Table 1 below.

TABLE 1

| Parameter | High-temporal resolution | High-spatial resolution |
|---|---|---|
| Acquisition type | Gradient echo (gradient recalled echo, fast field echo) | |
| TR/TE (ms) | 3.2/1.6 | 4.8/2.4 |
| Acquisition voxel size (mm³) | 1.5 × 1.5 × 3.0 | 0.8 × 0.8 × 1.6 |
| SENSE acceleration factor (RL) | 4 | 2.5 |
| SENSE acceleration factor (FH) | 2 | 2 |
| Halfscan (partial Fourier) factor | 0.75 ($k_y$); 0.85 ($k_z$) | 0.85 ($k_y$); 1 ($k_z$) |
| Temporal resolution range (s) | 6.9-9.9 | 60-79.5 |
| Number of slices | 100-120 | 187-225 |

TABLE 1-continued

| Flip angle (degrees) | 10° |
| --- | --- |
| Field-of-view (mm) | 300-370 |
| Fat suppression method | SPAIR (TR: 155 ms; inversion delay: 80 ms) |

All images were acquired in the axial plane. Temporal resolution for the high-temporal resolution acquisitions ranged from 7 to 10 seconds (s), depending on the size of the FOV and the number of slices acquired. The DCE series consisted of one pre-contrast high-spatial acquisition, followed by five pre-contrast high-temporal acquisitions, followed by eight post-contrast high-temporal acquisitions started immediately after injection and ending 55-80 seconds after injection, followed by four post-contrast high-spatial acquisitions. The contrast medium was injected at a dose of 0.1 millimoles/kilogram (mM/kg) gadobenate dimeglumine (Multihance, Bracco, N.J.) at two milliliters (ml)/s, followed by a saline flush of 20 ml at 2 ml/s. The five pre-contrast high-temporal acquisitions were acquired to define the baseline image data. The DCE series was acquired as one sequence block.

Figure 5A:
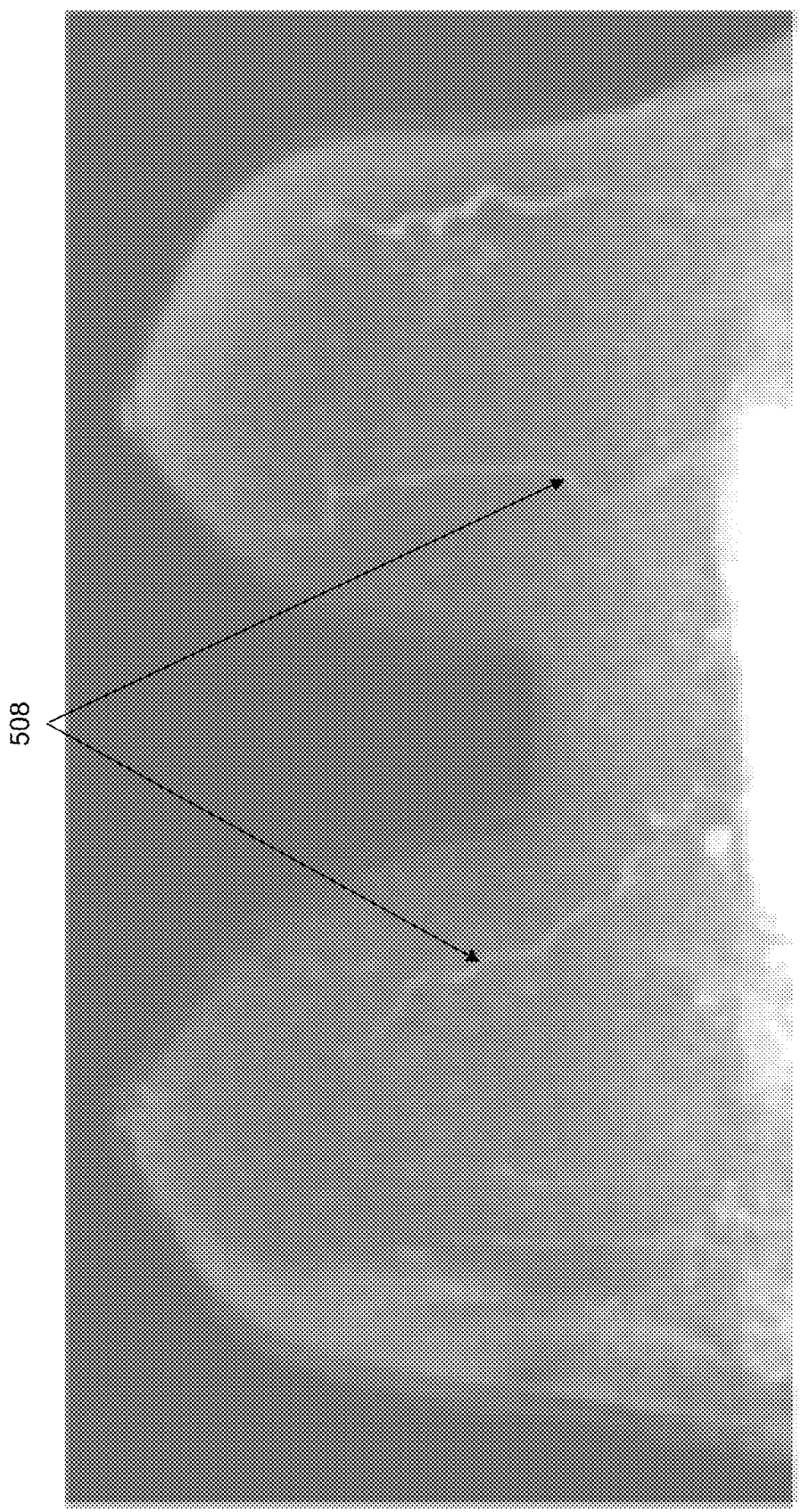
FIGS. 5A-5H depict maximum intensity projections of subtracted image data (5A-5D) and gradient image data (5E-5H) computed by the MRI data processing device of FIG. 1 in accordance with an illustrative embodiment.
Figure 5B:
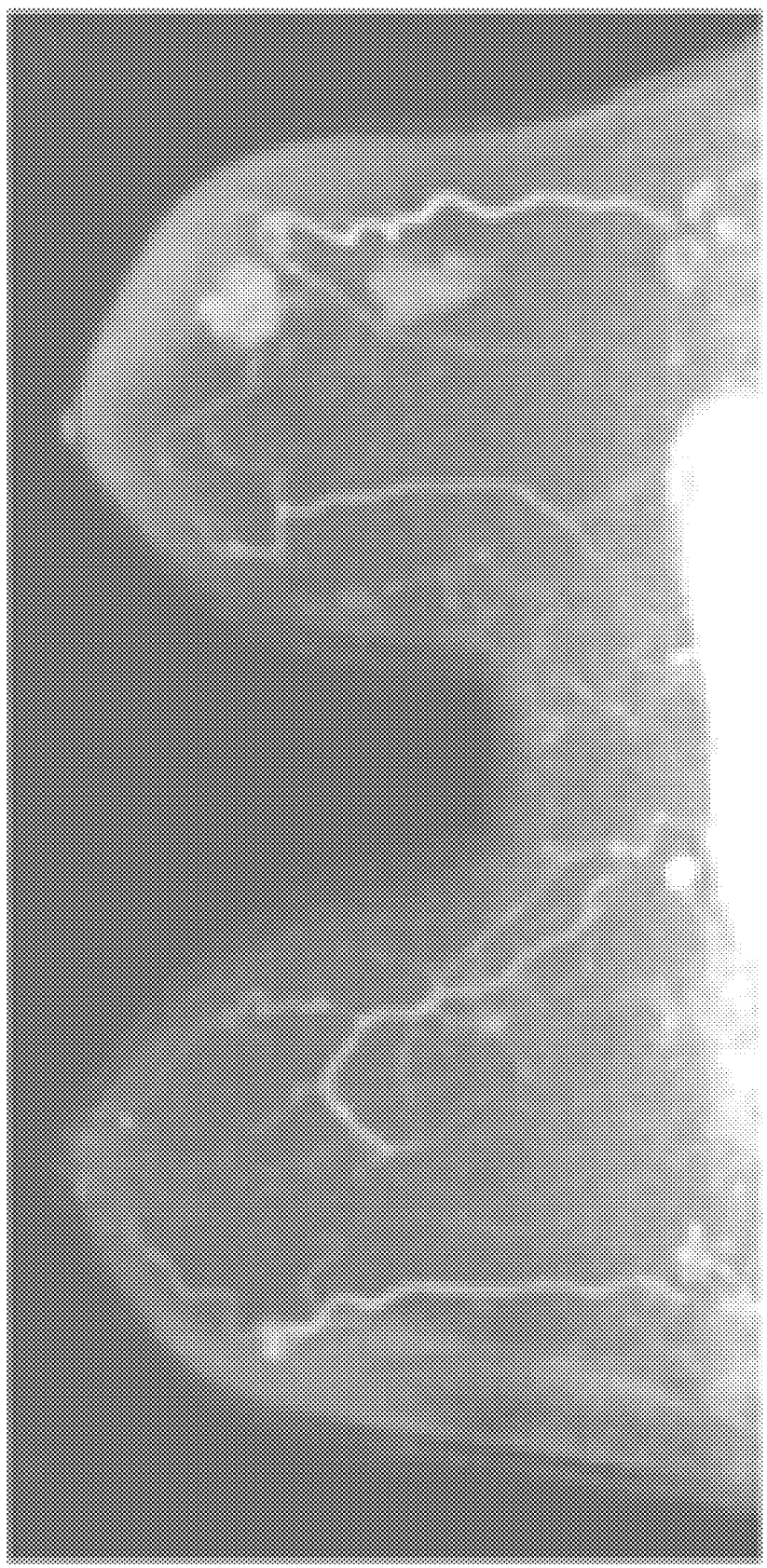
Figure 5C:
Figure 5D:
Figure 5E:
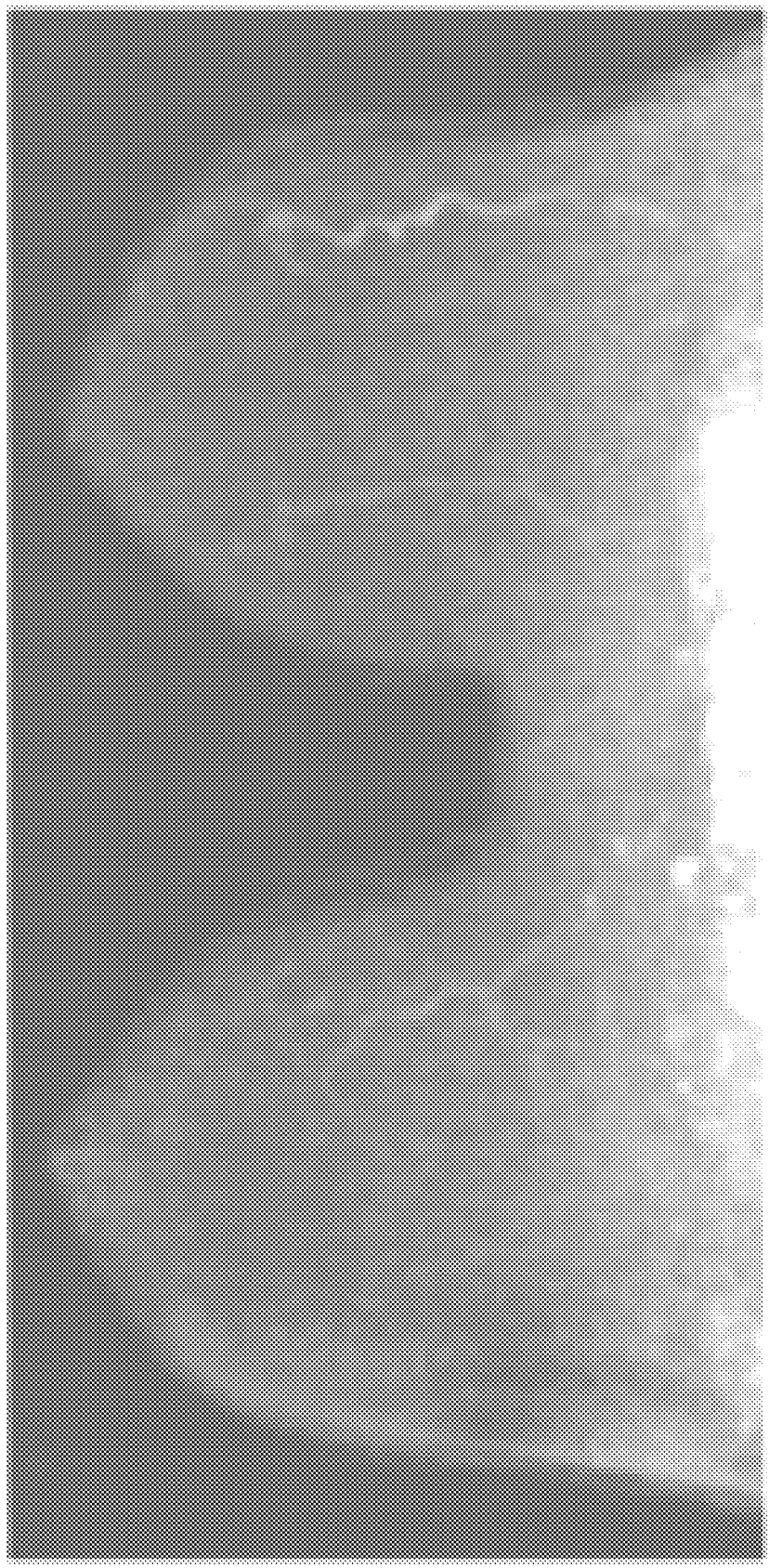
Figure 5F:
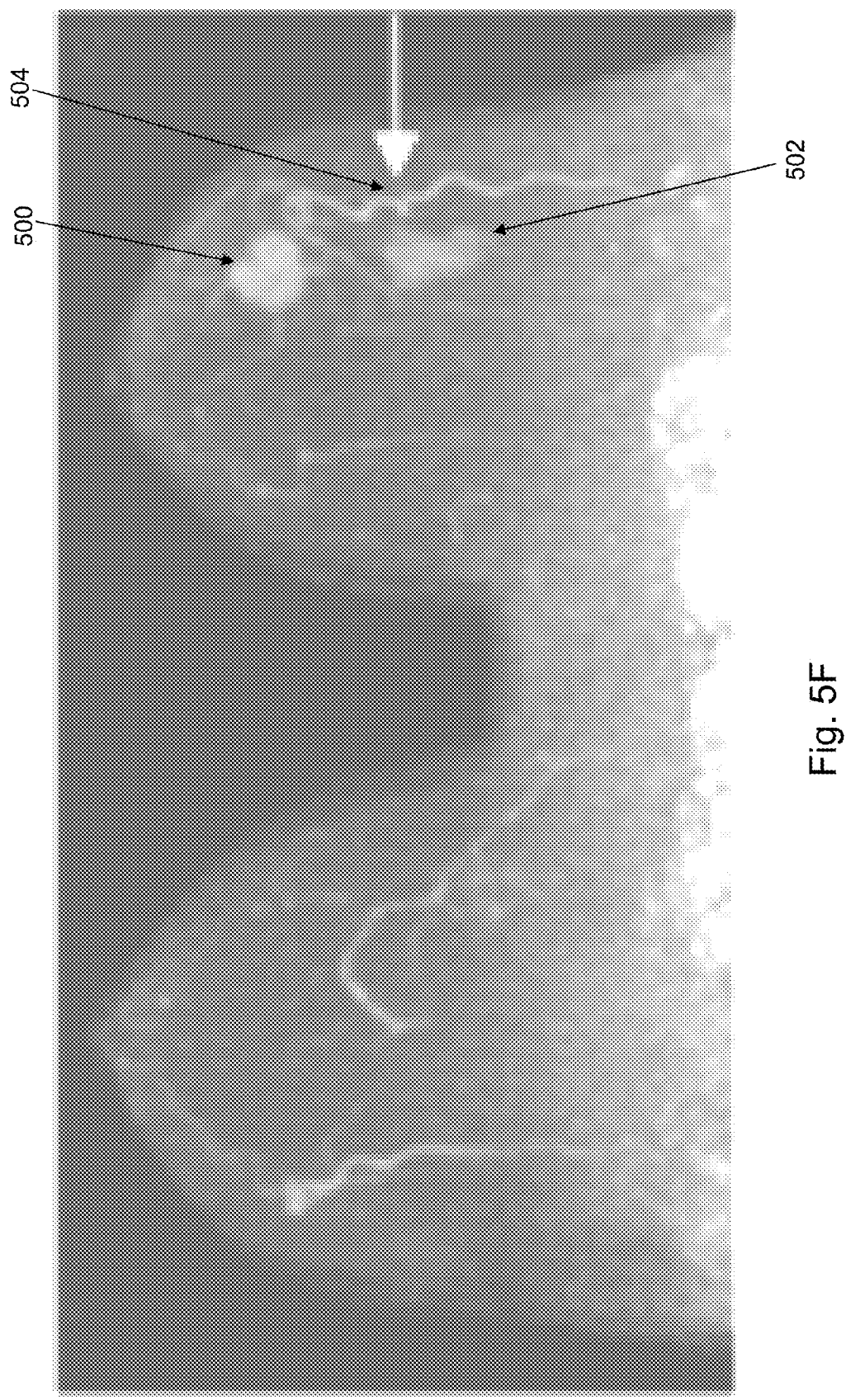
Figure 5G:
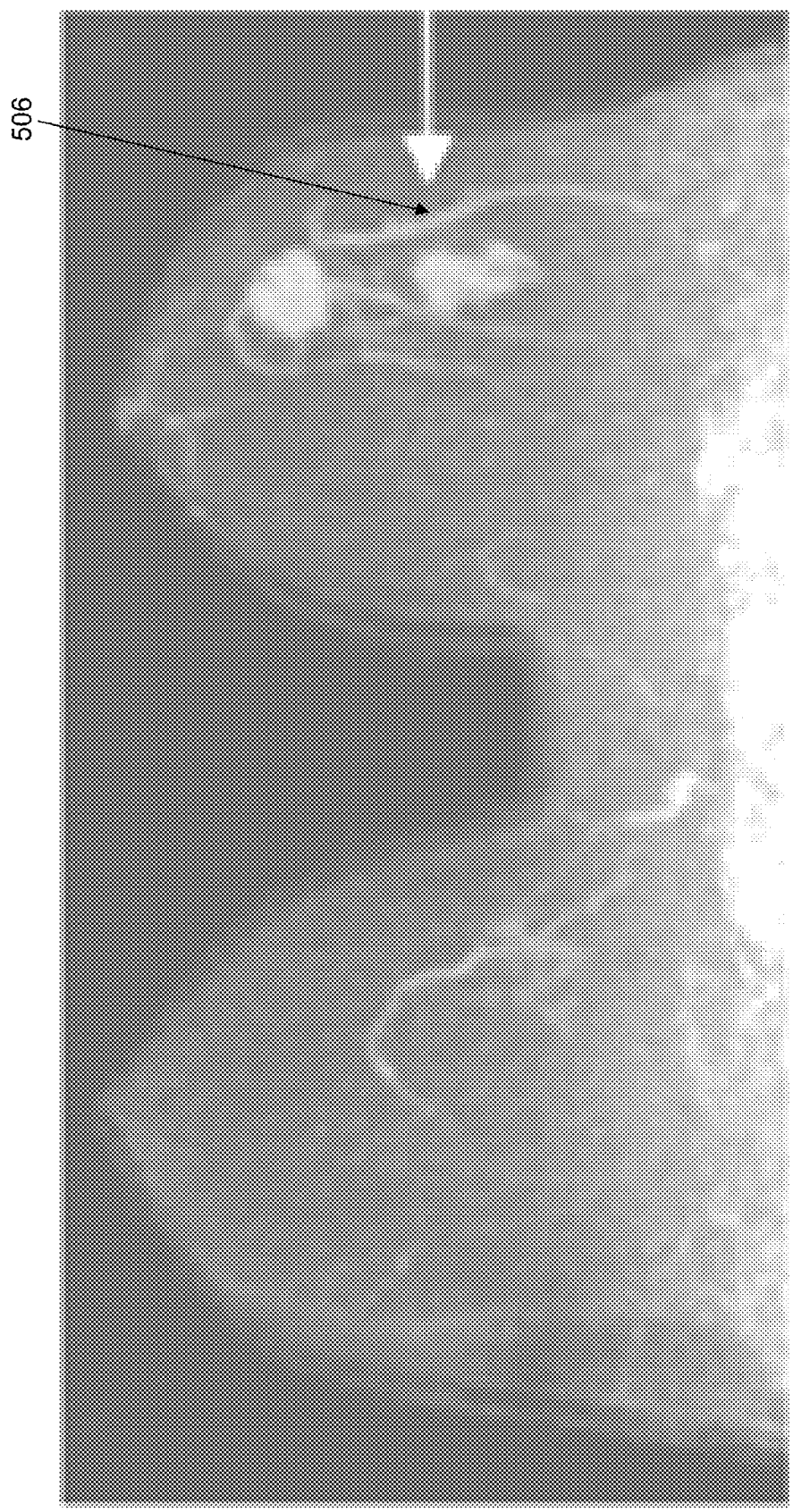
Figure 5H:
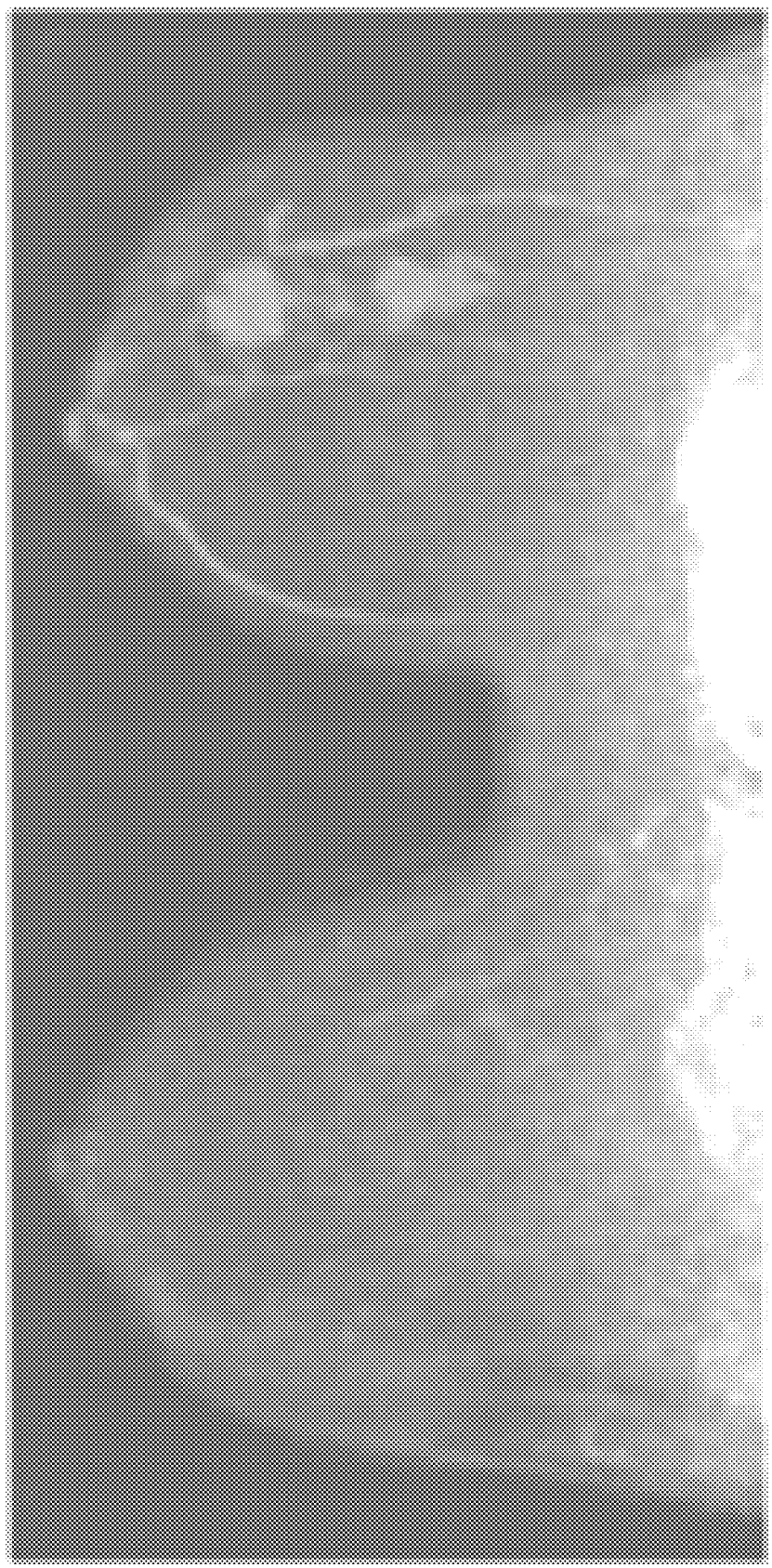

FIGS. 5A-5H were acquired with a nine second temporal resolution. Arterial enhancement can be visualized in the MIPs, identifying the time-point at which the contrast medium reaches internal mammary artery 508, for example, as seen in FIGS. 5A and 5E. A first invasive ductal carcinoma 500 and a second invasive ductal carcinoma 502 are visible in FIGS. 5B-5H. A first vessel 504 feeding and draining a lesion in an arterial phase is shown in FIG. 5F. A second vessel 506 feeding and draining the lesion in a venous phase is shown in FIG. 5G.

MIPs from the post-contrast high-temporal images showed a signal increase in first vessel 504 and in second vessel 506, including very early enhancement in tortuous vessels directly feeding tumors, followed by a signal increase in the tumors. The gradient image data show a slowing signal increase in the arteries, and in FIG. 5G, second vessel 506, a blood vessel posterior and lateral to the lesions, is seen enhancing immediately after enhancement of the lesion making it likely a vein draining the tumor.

In an operation 230, identification of baseline artery voxels may be received. For example, the user may select the voxels that make up at least a portion of the baseline artery voxels using display 128, mouse 124, and/or keyboard 126. The user may touch display 128 that is a touch screen and drag across the region or may select corners using mouse 124 or keyboard 126 and display 128. The positions selected in the MIPs identify locations of the baseline artery voxels.

In an operation 232, a baseline time-of-arrival (TOA) of a contrast bolus in the baseline artery may be determined using the identified locations of the baseline artery voxels, the subtracted image data, the baseline artery TOA determination model, and the value $S_{se}$ of the significant enhancement parameter. For example, referring to FIG. 3, example operations performed by image data processing application 116 to determine the TOA of the contrast bolus are described. Once the baseline TOA is determined, this is set as t=0 for all other measurements.

In an operation 300, first post-contrast high-temporal resolution image data associated with a first post-contrast high-temporal resolution acquisition is selected from the subtracted image data as a current image. Each image is associated with data that defines a 3-D or a 2-D MRI data acquisition.

In an operation 302, the baseline artery voxels may be selected from the baseline image data using the identified locations of the baseline artery voxels.

In an operation 304, an average of the baseline signal values, $B_{sva}$, associated with the selected baseline artery voxel locations in the baseline image data may be determined.

In an operation 306, the baseline artery voxels may be selected from the current image using the identified locations of the baseline artery voxels. For example, the baseline artery voxel locations are selected.

In an operation 308, an average of the signal values, SVA, associated with the selected baseline artery voxel locations in the current image may be computed. The computed average of the signal values SVA and the acquisition time of the current image may be indicated as a current data point.

In an operation 309, an enhancement value EV may be computed as the determined average signal value relative to the determined average baseline signal value. For example, the enhancement value may be computed as $EV=(SVA-B_{sva})/B_{sva}$.

In an operation 310, a determination may be made concerning whether or not EV is greater than or equal to $S_{se}$. EV and $S_{se}$ may be defined as a percent. When EV is greater than or equal to $S_{se}$, processing continues in an operation 312. When EV is not greater than or equal to $S_{se}$, processing continues in an operation 314. In an alternative embodiment, the test may be greater than $S_{se}$ instead of greater than or equal to $S_{se}$.

In operation 312, a determination may be made concerning whether or not the current image is associated with the first post-contrast high-temporal resolution image. When the current image is the first post-contrast high-temporal resolution image, processing continues in an operation 316. When the current image is not the first post-contrast high-temporal resolution image, processing continues in an operation 318.

Figure 2B:
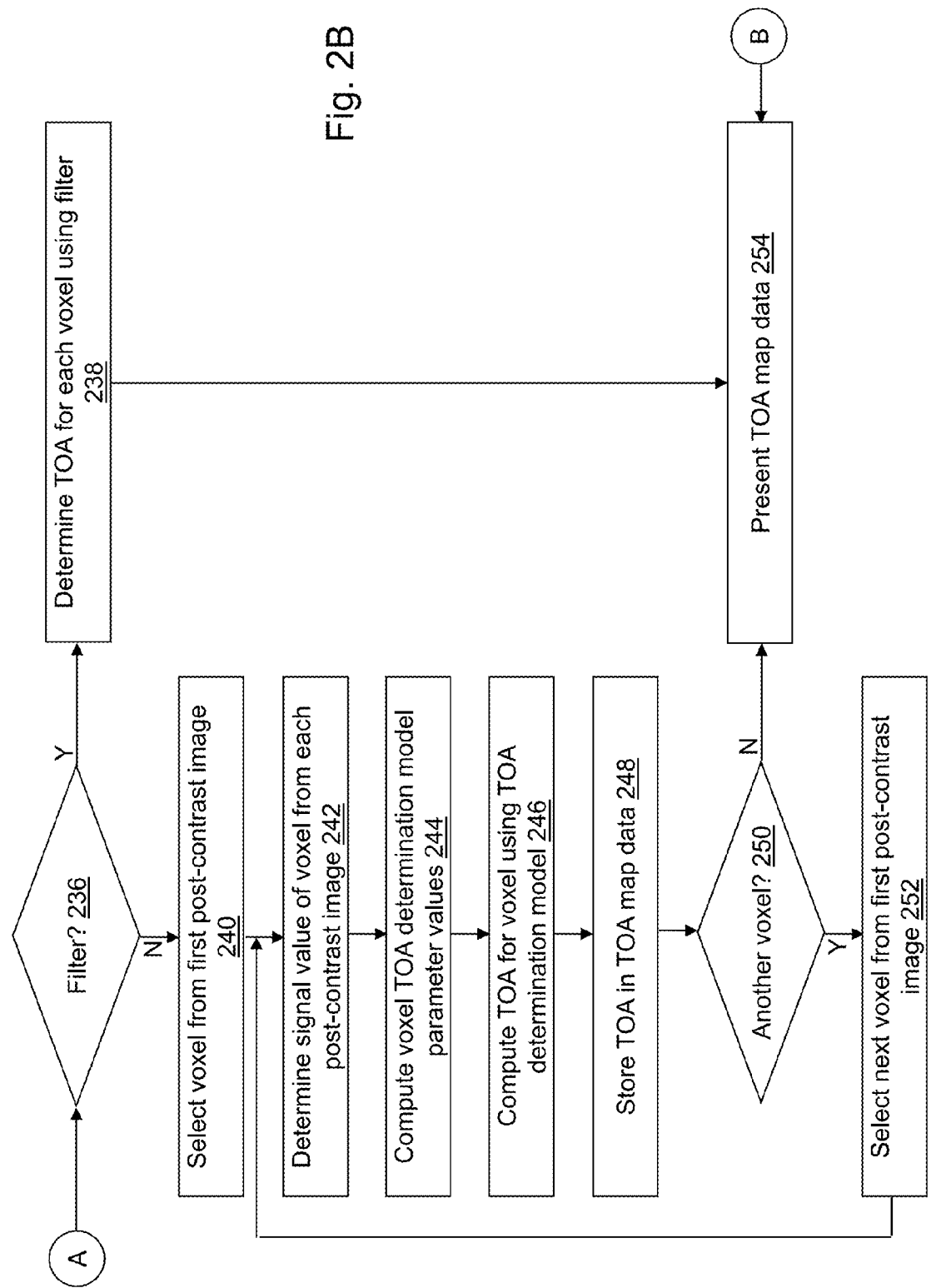
Figure 3:
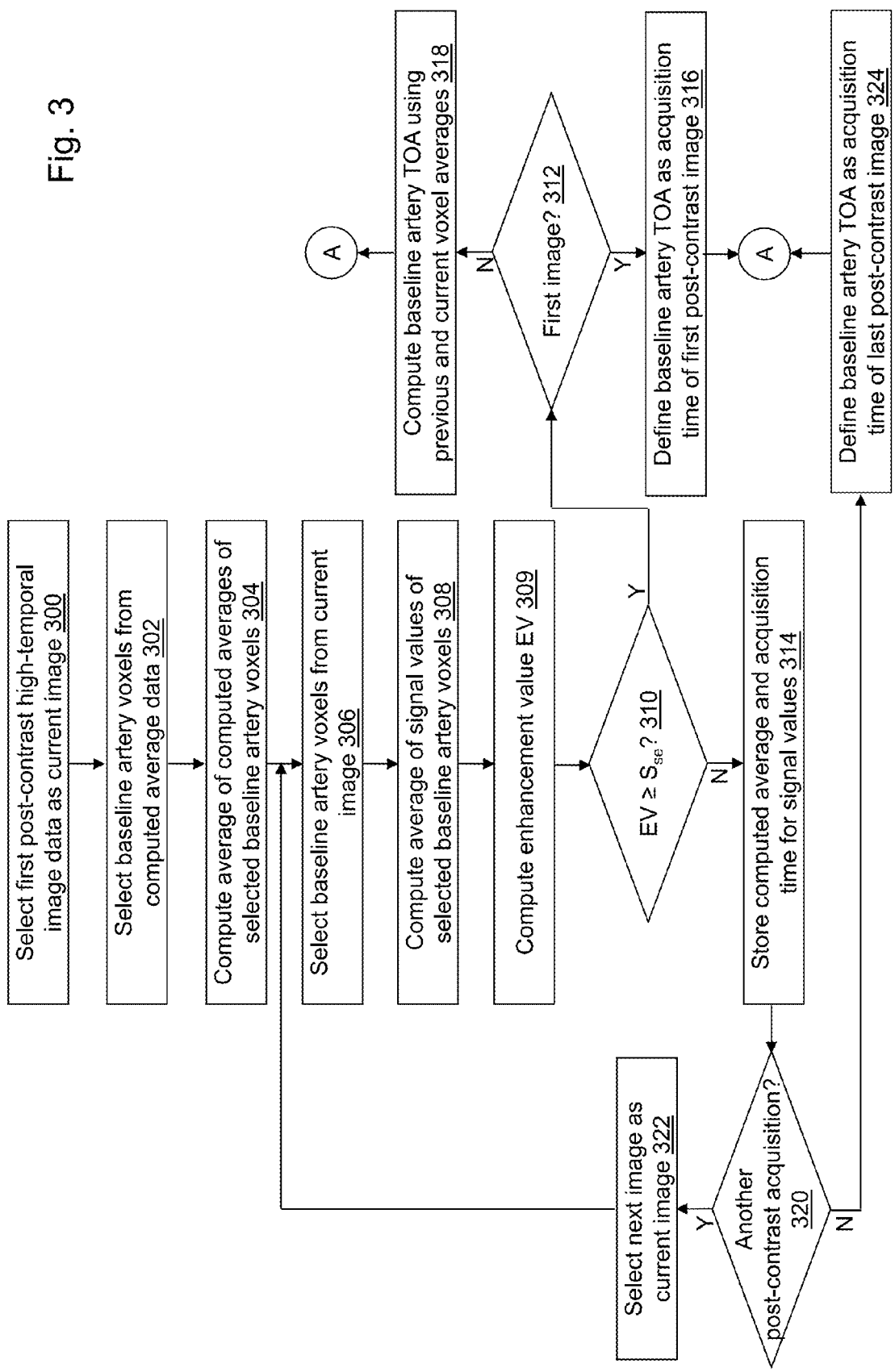

In operation 316, the TOA of the contrast bolus in the baseline artery may be defined as an acquisition time of the first post-contrast high-temporal resolution image data, and processing continues in an operation 236 shown referring to FIG. 2B. As an alternative, the TOA of the contrast bolus in the baseline artery may be computed using SVA, $B_{sva}$, the relative time between the current image and the time of injection of the contrast medium into the subject, and the baseline artery TOA determination model. For example, the two data points are interpolated using the baseline artery TOA determination model to compute the TOA of the contrast bolus in the baseline artery. The TOA is computed as the time at which arterial signal enhancement first reached a value of $S_{se}$.

In an operation 318, the TOA of the contrast bolus in the baseline artery may be computed using the previous and current data points and the baseline artery TOA determination model. For example, the current and previous data points are interpolated using the baseline artery TOA determination model to compute the TOA of the contrast bolus in the baseline artery. The TOA is computed as the time at which arterial signal enhancement first reached a value of $S_{se}$, and processing continues in operation 236 shown referring to FIG. 2B.

In operation 314, the computed average of the signal values SVA and the acquisition time of the current image are stored as a previous data point.

In operation 320, a determination may be made concerning whether or not the subtracted image data includes another post-contrast high-temporal resolution acquisition that has not been evaluated. When the subtracted image data includes another acquisition, processing continues in an operation 322. When the subtracted image acquisition does not include another image, processing continues in an operation 324.

In operation 322, a next image may be selected from the subtracted image data as a current image, and processing continues in operation 306 to process the next image.

In operation 324, the TOA of the contrast bolus in the baseline artery may be defined as an acquisition time of the last post-contrast high-temporal resolution image data, and processing continues in operation 236 shown referring to FIG. 2B. An error message further may be issued, for example, to display 128.

Referring to FIG. 2B, in operation 236, a determination may be made concerning whether or not to apply the filter. When the filter is to be applied, processing continues in an operation 238. When the filter is not to be applied, processing continues in an operation 240.

In operation 238, the TOA of the contrast bolus in each voxel of the subtracted image data exclusive of the identified baseline artery voxels may be determined using the filter. For example, referring to FIG. 4, example operations performed by image data processing application 116 to determine the TOA of the contrast bolus using the filter are described.

In an operation 400, a first voxel may be selected as a current voxel from the first post-contrast high-temporal resolution image data associated with a first post-contrast high-temporal resolution image. For example, a voxel location of a first voxel exclusive of the identified baseline artery voxels is selected.

In an operation 402, a baseline signal value $B_{sv}$ associated with the voxel location in the baseline image data may be determined.

In an operation 404, a deviation signal value $B_\sigma$ associated with the voxel location in the deviation image data may be determined.

In an operation 406, a signal value SV associated with the voxel location in the current image may be determined.

In an operation 407, a number of standard deviations $N_{SV}$ may be computed as $N_{SV}=(SV-B_{sv})/B_\sigma$.

In an operation 408, a determination may be made concerning whether or not $N_{SV}$ is greater than or equal to $N_\sigma$ if the deviation filter condition is indicated in operation 206. When $N_{SV}$ is greater than or equal to $N_\sigma$, processing continues in an operation 410. When $N_{SV}$ is not greater than or equal to $N_\sigma$, processing continues in an operation 413. In an alternative embodiment, the test may be greater than $N_\sigma$ instead of greater than or equal to $N_\sigma$.

In operation 410, an enhancement value EV may be computed for the determined signal value relative to the determined baseline signal value. For example, the enhancement value may be computed as $EV=(SV-B_{sv})/B_{sv}$.

In an operation 412, a determination may be made concerning whether or not EV is greater than or equal to $S_{sev}$ if the enhancement filter condition is indicated in operation 206. EV and $S_{sev}$ may be defined as a percent. When EV is greater than or equal to $S_{sev}$, processing continues in an operation 414. When EV is not greater than or equal to $S_{sev}$, processing continues in operation 413. In an alternative embodiment, the test may be greater than $S_{sev}$ instead of greater than or equal to $S_{sev}$.

In operation 413, a success counter $i_s$ may be initialized to zero, and processing continues in an operation 420.

In operation 414, a success counter $i_s$ may be incremented. For example, one may be added to the success counter for each iteration of 414.

In an operation 416, a determination may be made concerning whether or not $i_s$ is greater than or equal to $N_{cons}$ indicated in operation 206. When $i_s$ is greater than or equal to $N_{cons}$, processing continues in an operation 418. When $i_s$ is not greater than or equal to $N_{cons}$, processing continues in operation 420. In an alternative embodiment, the test may be greater than $N_{cons}$ instead of greater than or equal to $N_{cons}$, and the success counter may be initialized to one.

In operation 418, a determination may be made concerning whether or not the current image is the first post-contrast high-temporal resolution image data. When the current image is the first post-contrast high-temporal resolution image data, processing continues in an operation 426. When the current image is not the first post-contrast high-temporal resolution image data, processing continues in an operation 428.

In operation 420, a determination may be made concerning whether or not the subtracted image data includes another post-contrast high-temporal resolution image that has not been evaluated. When the subtracted image data includes another image, processing continues in an operation 422. When the subtracted image data does not include another image, processing continues in an operation 432.

In operation 422, the signal value SV may be stored as a previous value PSV.

In an operation 424, the current voxel may be selected from the next post-contrast high-temporal resolution image data associated with a next post-contrast high-temporal resolution acquisition. For example, the same voxel location is selected from the next post-contrast high-temporal resolution image data, and processing continues in operations 424 to evaluate the same voxel location in the next post-contrast high-temporal resolution image data.

In operation 426, the TOA of the contrast bolus in the current voxel may be defined as an acquisition time of the first post-contrast high-temporal resolution image data minus the baseline TOA of the contrast bolus in the baseline artery, and processing continues in an operation 432.

In an operation 428, the TOA of the contrast bolus in the voxel may be computed using SV, PSV, the relative times of the current image and the previous image, and the voxel TOA determination model. The computed TOA is further computed relative to the baseline TOA of the contrast bolus in the baseline artery. For example, the two current and previous data points are interpolated using the voxel TOA determination model to compute the TOA of the contrast bolus in the voxel. The TOA is computed as the time at which arterial signal enhancement first reached a value of $S_{sev}$. The TOA of the contrast bolus in the voxel is further computed by subtracting the baseline TOA of the contrast bolus in the baseline artery.

In an operation 430, the computed TOA may be stored in TOA map data 122 in association with the current voxel location so that a spatial visualization of the computed TOA can be presented, for example, on display 128.

In an operation 432, a determination may be made concerning whether or not the current image includes another voxel that has not been evaluated excluding the identified baseline artery voxels. When the current image includes another voxel, processing continues in an operation 434. When the current image does not include another voxel, processing continues in an operation 254 shown referring to FIG. 2B.

In operation 434, a next voxel may be selected from the first post-contrast high-temporal resolution image data as a current voxel, and processing continues in operation 402 to process the next voxel. For example, the voxel location of a next voxel of the first post-contrast high-temporal resolution image data exclusive of the identified baseline artery voxels is selected. Success counter $i_s$ further may be reinitialized to zero.

Referring again to FIGS. 5A-5H, for most cases (19 out of 20), significant arterial enhancement (>20%) was measured in the second or third post-contrast high-temporal image, in the internal mammary artery (baseline artery). For three cases, first vessel 504 feeding the lesion began to enhance at the same time as the internal mammary artery. In all other cases, the vessel feeding the lesion enhanced later than the internal mammary artery.

The average percentage of voxels in the entire FOV satisfying the filter conditions of five standard deviations, greater than 20% signal enhancement relative to baseline, and at least two consecutive filter satisfactions started at 0.4% of the FOV in the first time-point post injection (when in most cases only the heart was enhanced) and monotonically rose to 5.7%±1.9% at a fourth time-point, and 7.3%±2.5% of the entire FOV by a last post-contrast high-temporal acquisition.

Image data processing application 116 may include the filter to identify significantly enhancing voxels and to reduce spurious enhancement due to noise or artifacts. For illustration, a first condition of the filter may be that the signal increase in a given voxel is greater than five times the standard deviation of the baseline signal in that voxel, measured from the five pre-contrast acquisitions. The value of five times the standard deviation was arrived at empirically, as it provided an adequate level of noise reduction. Alternative values may be used. For further illustration, a second condition may be that the signal enhancement is greater than 20% of the baseline signal. For additional illustration, a final condition may be that a voxel is required to satisfy the previous two conditions for at least two consecutive time-points.

In operation 240, a first voxel may be selected from the current image as a current voxel. For example, a current voxel location of a first voxel of the current image excluding the identified baseline artery voxels is selected.

In an operation 242, a signal value may be determined for the current voxel location in each post-contrast high-temporal resolution image to define a plurality of data points for the current voxel location. Each data point includes the signal value and the associated time the post-contrast high-temporal resolution image was acquired.

In an operation 244, voxel TOA determination model parameters may be computed. For example, when the voxel TOA determination model is "Linear interpolation", a slope and a y-intercept are computed for lines defined between successive data points to define a signal enhancement model from which the TOA can be determined. As another example, when the voxel TOA determination model is "Linear curve fit", the data points are fit to a line and the slope and the y-intercept of that line define the signal enhancement model. The slope and y-intercept are the computed voxel TOA determination model parameters that define the signal enhancement model.

As yet another example, when the voxel TOA determination model is "Exponential curve fit", the data points are fit to an exponential to define the signal enhancement model as $A(1-\exp(-\alpha(t-t_0)))$ for $t > t_0$ and as zero for $t \leq t_0$, where $t_0$ is a time of initial signal enhancement due to the contrast medium injection, A is an upper limit of enhancement, and a is an uptake rate. A, $\alpha$, and $t_0$ are the computed voxel TOA determination model parameters that define the signal enhancement model.

In an operation 246, the TOA may be computed for the voxel as the time at which arterial signal enhancement first reached the value of $S_{se}$ using the defined signal enhancement model.

In an operation 248, the computed TOA may be stored in TOA map data 122 in association with the current voxel location so that a spatial visualization of the computed TOA can be presented, for example, on display 128.

In an operation 250, a determination may be made concerning whether or not the current image includes another voxel that has not been evaluated excluding the identified baseline artery voxels. When the current image includes another voxel, processing continues in an operation 252. When the current image does not include another voxel, processing continues in an operation 254.

In operation 252, a next voxel may be selected from the current image as a current voxel, and processing continues in operation 242 to process the next voxel. For example, the voxel location of a next voxel of the current image exclusive of the identified baseline artery voxels is selected.

In operation 254, TOA map data 122 may be presented on display 128. TOA map data 122 may be overlaid on image data 120, on the subtracted image data, the gradient image data, etc. to visualize locations of fast uptake of the contrast medium. Time-of-arrival maps may be presented by color coding the voxel TOA relative to the TOA of the contrast bolus in the baseline artery. These TOA color maps also may be overlaid on higher spatial resolution images constructed from the post-contrast high-spatial resolution acquisitions. For illustration, FIGS. 6A-6D show TOA maps overlaid on post-contrast high-spatial resolution data for both malignant and benign lesions.

TOA maps were created as a way of visualizing the time at which lesions began enhancing at the time of initial enhancement within lesions. Referring to FIGS. 6A-6D, examples of TOA color maps (in seconds) for cases presenting with (lesions marked by arrows). FIG. 6A shows an invasive ductal carcinoma (IDC). FIG. 6B shows a primary and a satellite IDC in a case with marked parenchymal enhancement. FIG. 6C shows a complex sclerosing lesion. FIG. 6D shows a fibroadenoma. FIGS. 6A-6D show a general trend that was observed, malignant lesions had shorter TOAs on average.

The results shown in FIGS. 6A-6D are typical of the lesions imaged; the average TOA was much shorter ($p < 0.01$) for malignant lesions (18.4 s±12.9 s) than for benign lesions (43.5 s±36.1 s). Intra-lesion heterogeneity in TOA can also be appreciated in these maps. In benign regions-of-interest (ROIs), an average intra-lesion coefficient of variation in TOA was 0.58±0.37, and in malignant lesions was 0.38±0.51.

ROIs may be drawn around the lesions, on the post-contrast high temporal and/or high-spatial resolution images (at each time-point), under a radiologists' guidance, and average signal enhancement may be measured at each time-point. Background parenchymal enhancement (BPE) may be measured for all cases by manually segmenting the parenchyma in a slice in the central part of the breast without any lesions present, and measuring the average signal intensity at each time-point. The signal intensity in the blood vessels feeding the lesions may also be measured for each time-point. Percent signal enhancement versus time data may be fit to a truncated (uptake only) empirical mathematical model (EMM) for malignant lesions, benign lesions, and parenchyma, for all the high-temporal resolution time-points and the first high-spatial resolution acquisition:

$$PSE(t) = A(1 - \exp(-\alpha t)), \quad (1)$$

where A is the upper limit of percent enhancement, and $\alpha$ is the uptake rate ($sec^{-1}$), and t is the time. A truncated EMM may be used to evaluate the potential diagnostic value of early kinetic data as measured with the proposed protocol. From the EMM fit parameters, three secondary parameters may be calculated: initial area under the contrast curve (iAUC) (Evelhoch J L: Key factors in the acquisition of contrast kinetic data for oncology. *J Magn Reson Imaging* 1999; 10:254-259.), time to 90% of maximum enhancement (T90), and initial slope (defined as a product of the uptake rate and the upper limit of enhancement). T90 may be used as a surrogate for time-to-peak enhancement because signal intensity in the model used increased monotonically.

Lesion conspicuity was quantified by calculating the ratio of signal increase in the lesion $((S(t)-S_0)_{lesion})$ to the signal increase of normal parenchyma $((S(t)-S0parenchyma)$ at each time-point:

$$r(t) = \frac{(S(t) - S_0)_{lesion}}{(S(t) - S_0)_{parenchyma}}. \quad (1)$$

Statistical significance of differences in parameters that describe early kinetics, between malignant and benign lesions, may be evaluated with Wilcoxon rank sum tests or z-test for proportions, where appropriate. Because multiple parameters may be investigated, Bonferroni corrections may be used to correct for multiple comparisons.

Figure 7:
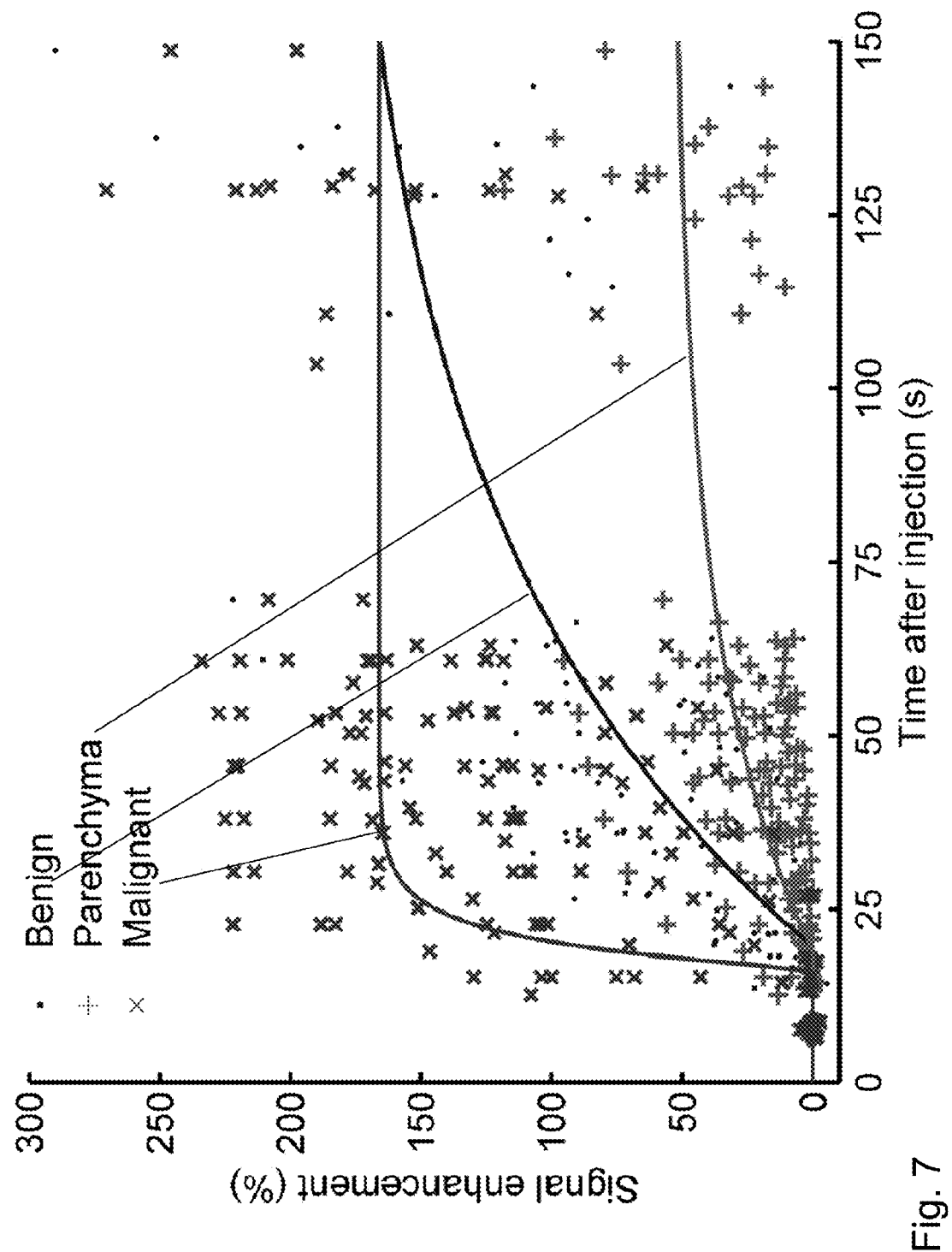
FIG. 7 depicts a scatter plot showing an average signal enhancement as a function of time from regions of interest computed by the MRI data processing device of FIG. 1 in accordance with an illustrative embodiment.

FIG. 7 shows a scatter plot of average signal enhancement from the ROIs, as a function of time for: malignant lesions, benign lesions and BPE with their respective average EMM fits. In FIG. 7, percent signal enhancement is plotted relative to the time of injection. While there is a large spread in the percent signal enhancement of all lesions, on average, malignancies were more strongly enhanced throughout the first minute than benign lesions and parenchyma, while parenchyma was least enhanced.

Average values (and standard deviations) of kinetic parameters derived from the EMM fits for both benign and malignant lesions and the malignant to benign ratio for the mean value of each parameter for +p<0.005 are shown in Table 2 below.

TABLE 2

| Parameter | Malignant | Benign | Ratio (M:B) |
| --- | --- | --- | --- |
| A (%) | 166 ± 52 | 187 ± 56 | 0.9 |
| α (%/s)+ | 24 ± 40 | 1.7 ± 1.3 | 14 |
| Initial Slope+ | 0.43 ± 0.79 | 0.03 ± 0.03 | 14 |
| iAUC (30s)+ | 31.56 ± 14.56 | 11.69 ± 8.29 | 2.7 |
| TOA (s)+ | 6.64 ± 4.14 | 19.6 ± 19.5 | 0.3 |
| T90 (s)+ | 36.8 ± 21.4 | 207.3 ± 124.4 | 0.2 |

The average EMM fits, using the parameters from Table 2, to the data from malignant lesions, benign lesions, and parenchyma are also plotted as solid lines, using the average value of arterial TOA, 11.6 s±5.8 s relative to the injection time, for illustration purposes. The average values of the primary and secondary EMM parameters for benign and malignant lesions can be seen in Table 2. Significant differences (post-Bonferroni corrections) were found between benign and malignant lesions for all parameters except for 'A', the upper limit of enhancement. Times-of-arrival measured with the EMM parameters were shorter than those from direct measurement with the filter, due to better estimation of the time at which signal enhancement was 20% in both arteries and lesions.

Lesion conspicuity was measured as described in Equation 1. On average (across all lesions), this ratio was at its highest during the early high-temporal resolution acquisitions, and reached its peak in the fourth high-temporal resolution acquisition post-injection); where its average was 11:1, compared to 4.4:1 by the last (eighth) high-temporal resolution acquisition. The difference between high-temporal resolution and high-spatial resolution acquisitions was most pronounced in cases with marked BPE.

Figure 8:
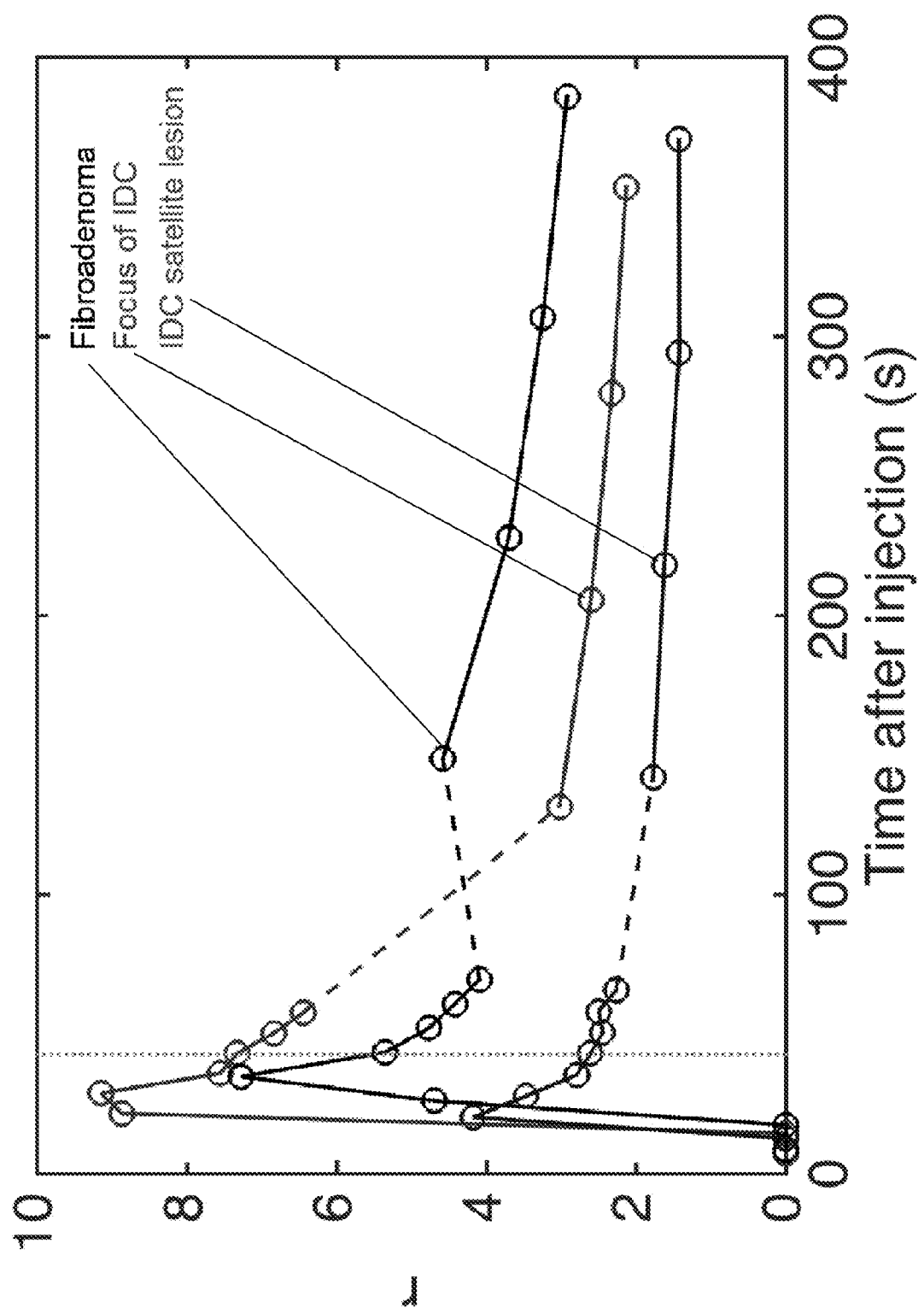
FIG. 8 depicts a ratio of a signal increase in a lesion to an increase in a background parenchyma for three lesions computed by the MRI data processing device of FIG. 1 in accordance with an illustrative embodiment.

FIG. 8 shows plots of a ratio of a signal increase in a lesion to an increase in a background parenchyma for three lesions with marked BPE in pre-menopausal women. The vertical dotted line indicates the approximate time at which a standard clinical protocol would acquire a center of k-space ($k_0$). The dashed lines in each curve connect the data points from the high-temporal resolution and standard high-spatial resolution protocols. For all of these cases, the maximum conspicuity of the lesion occurs before the time to '$k_0$' in the standard high-spatial resolution protocol. As a result, the conspicuity of these lesions would have been reduced on conventional clinical images compared to images acquired with the high-temporal resolution protocol.

Figure 9B:
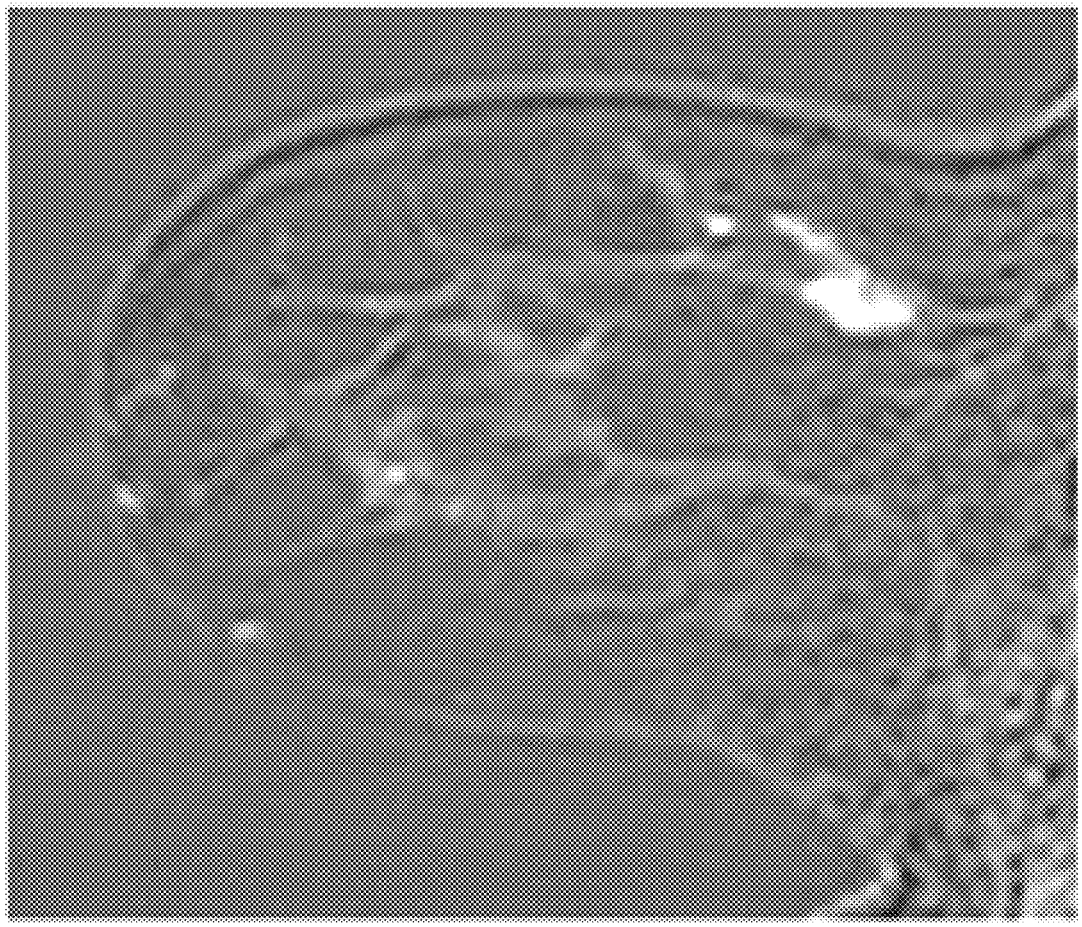
Figure 9C:
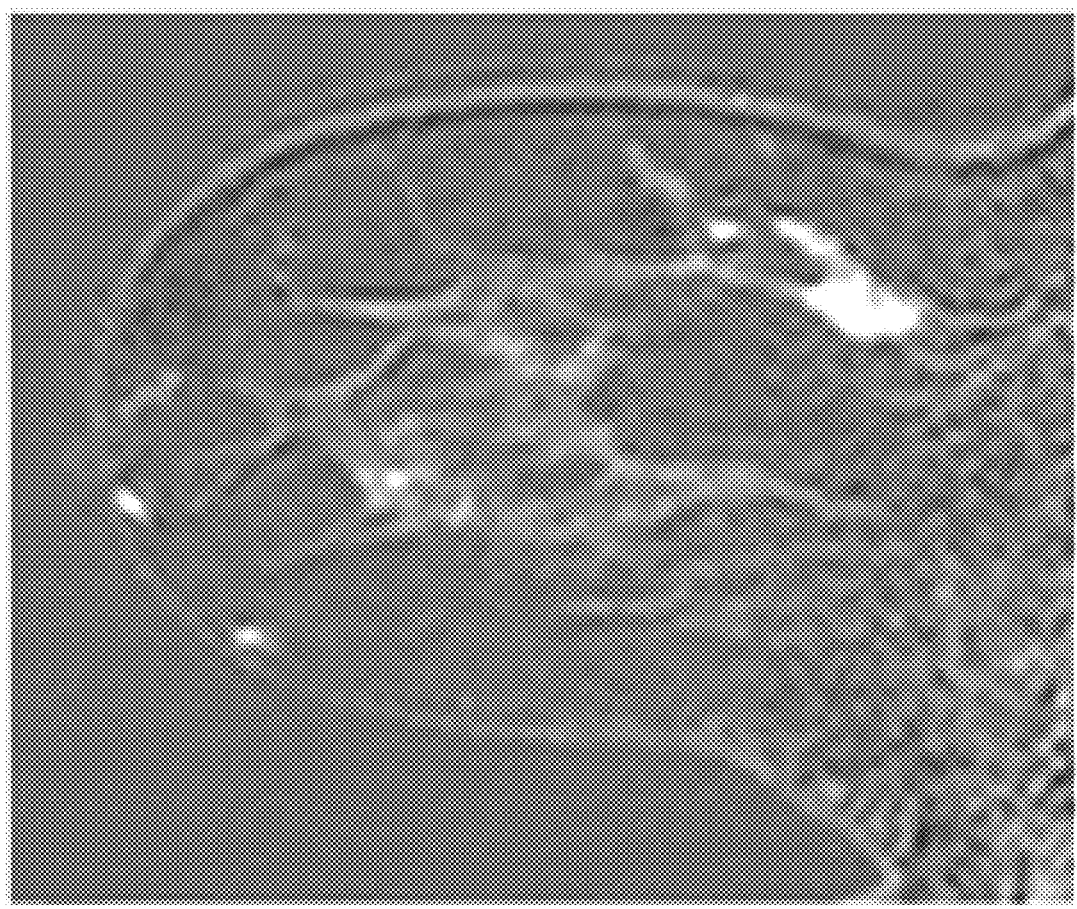
Figure 9D:
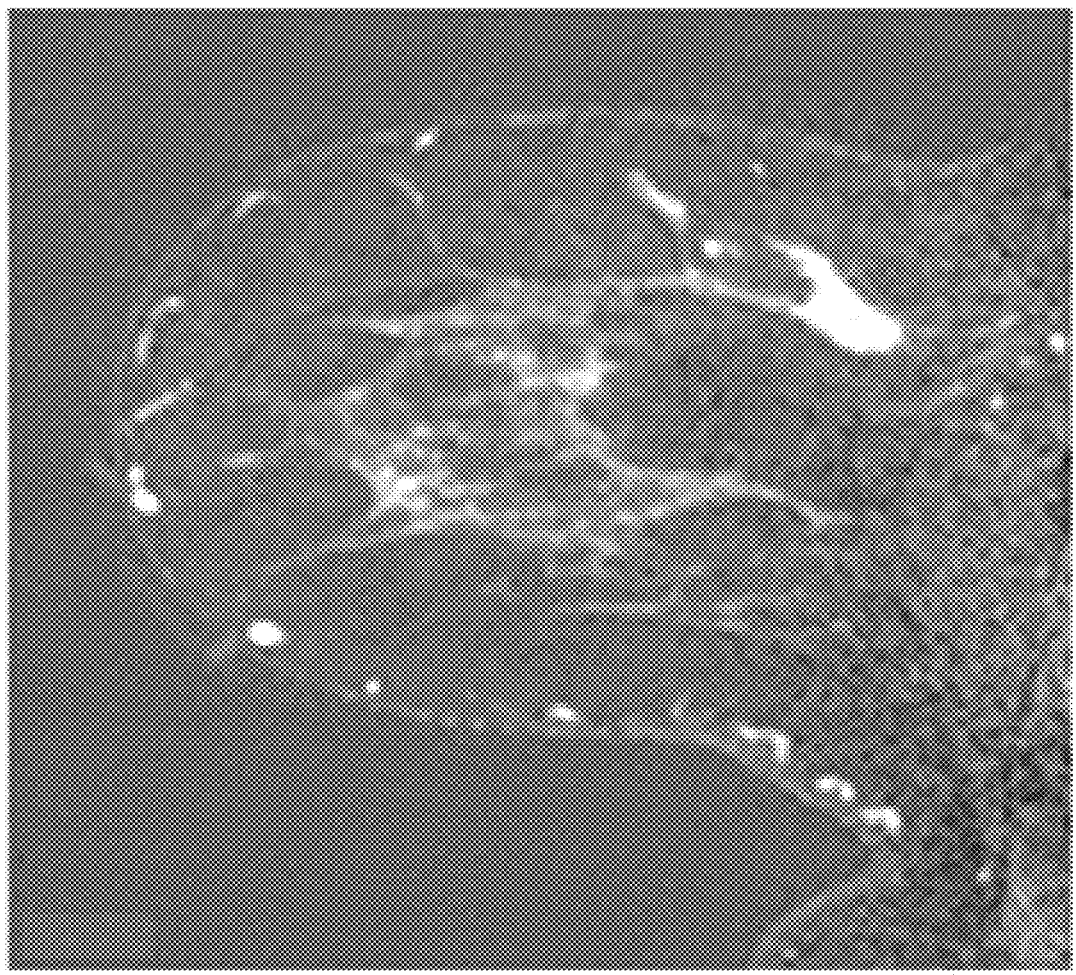
Figure 9E:
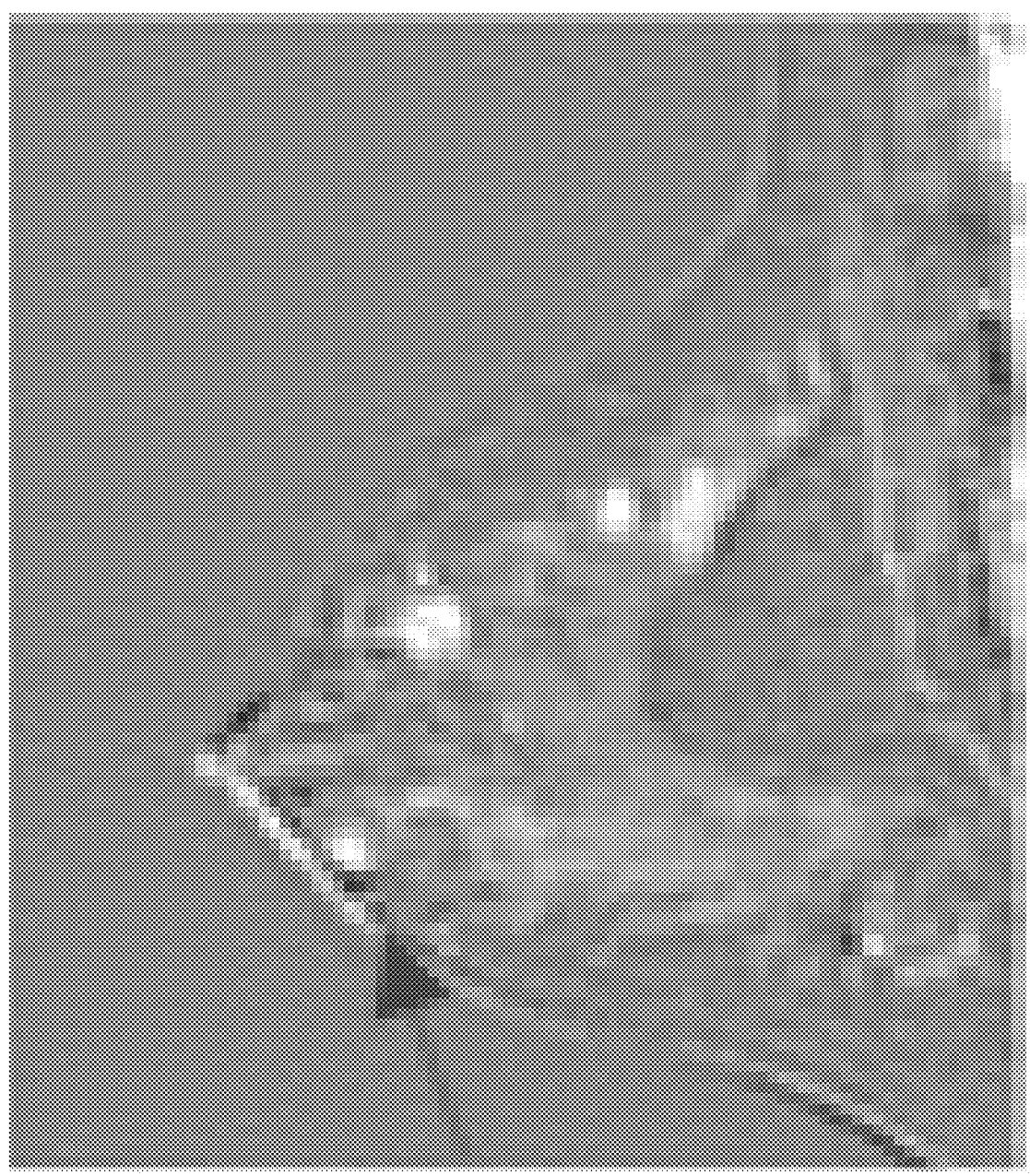
Figure 9F:
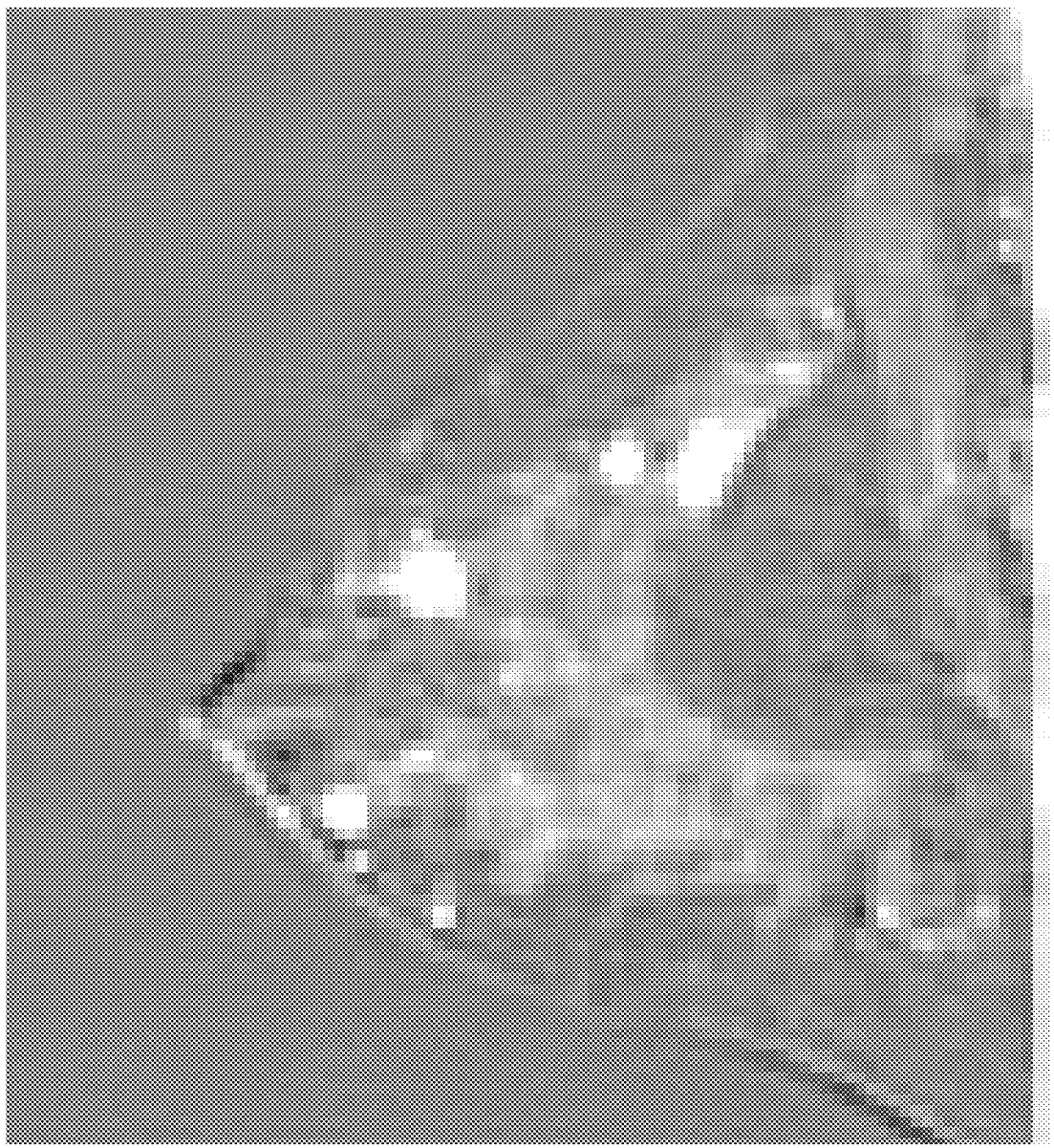
Figure 9G:
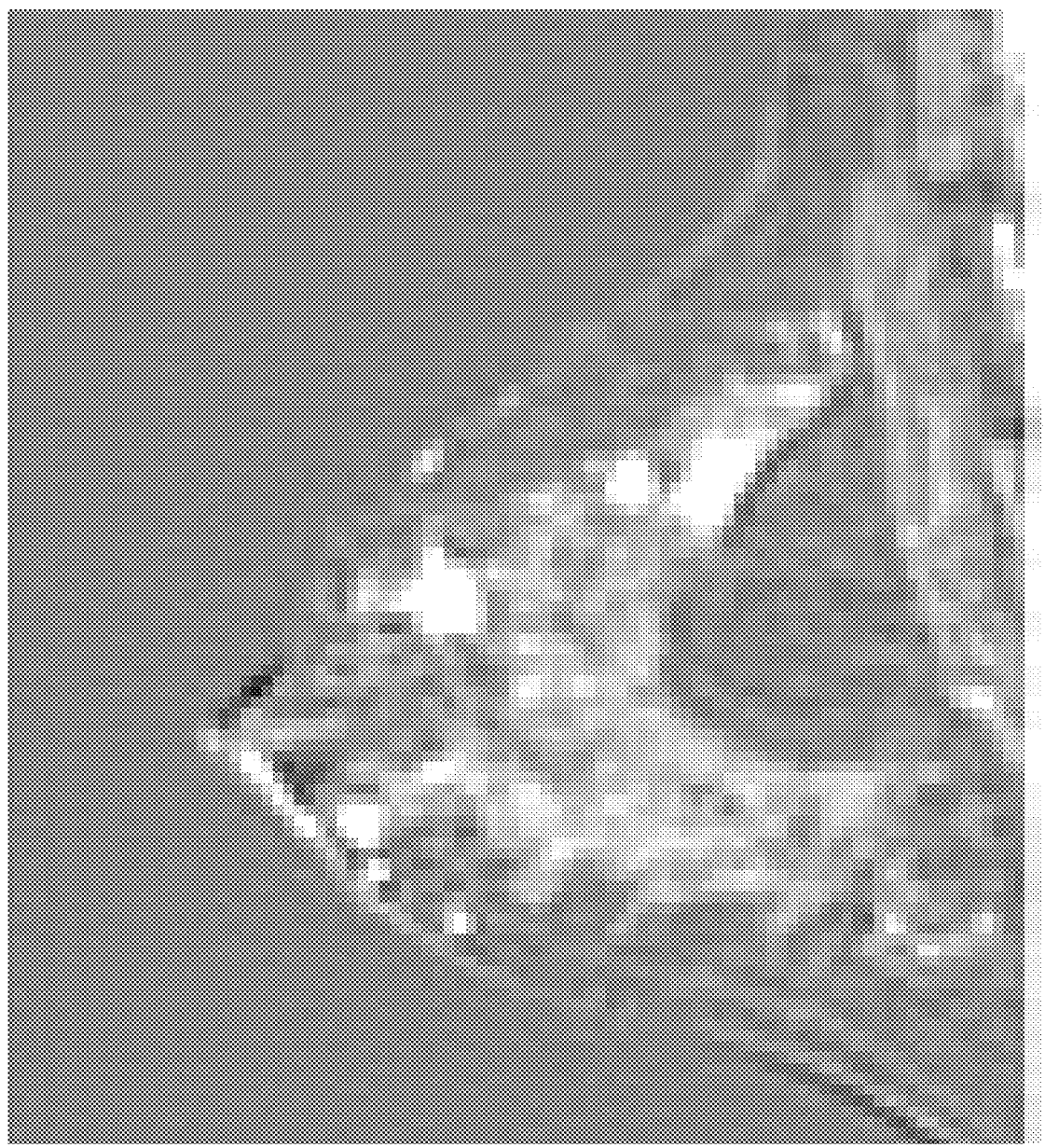
Figure 9H:

Subtraction images for three high-temporal resolution time-points and the first time-point of the standard high-spatial resolution protocol, from two of the cases in FIG. 8 (a fibroadenoma and an IDC satellite lesion) are shown in FIGS. 9A-9H. FIGS. 9A-9H show two examples of lesions (marked by arrows) where background parenchymal enhancement (BPE) reduces conspicuity in later time-points; FIGS. 9A-9C and 9E-9G show the three high-temporal resolution acquisitions. FIGS. 9D and 9H show the high-spatial resolution images acquired at approximately two minutes post-injection. In FIGS. 9A-9D, a fibroadenoma is visible as an oval circumscribed mass in the early images, but is isointense with parenchyma in FIG. 9D. In FIGS. 9E-9H, a satellite invasive ductal carcinoma is clearly defined in FIGS. 9F and 9G, but is less conspicuous in FIG. 9H.

Ultrafast (high-temporal resolution) imaging resolves the early kinetics of lesions, blood vessels, and parenchyma in the first seconds after the contrast medium bolus arrives in the arteries of the breast. On average, malignant lesions enhanced earlier and more rapidly than benign lesions. Ultrafast imaging allowed analysis of the TOA data with respect to the time of initial arterial enhancement, which is not possible in conventional DCE-MRI with temporal resolution above one minute. The results suggest that ultrafast imaging allows evaluation of the local vasculature characteristics while reducing the influence of global variables such as cardiac output. In contrast, in standard clinical protocols the enhancement in early images is dependent on when the contrast bolus reaches the breast, and thus, on cardiac output, which has significant intra- and inter-patient variability. Time-of-arrival maps showed lesions clearly based on time of initial enhancement, and also showed heterogeneous enhancement of lesions at early times after injection. This information is not available from conventional clinical DCE-MRI and may help to increase diagnostic accuracy and efficiency of radiologists.

The current 'ultrafast' images were acquired with only modest spatial resolution to increase temporal resolution.

However, the very sparse early enhancement suggests that both high-temporal and high-spatial resolution could be achieved simply by allowing fold-back of early post-injection data into a smaller FOV with post-processing to unfold images. Higher temporal resolution allows accurate measurement of the AIF, speed of propagation of the bolus through vessels feeding the lesion, precise arrival time of the bolus, and extraction and dispersion of the bolus as it passes through the lesion. These parameters may have diagnostic utility.

As described above, image data processing application 116 characterizes the kinetics of early enhancement in arteries, veins, malignant lesions, benign lesions, and normal-appearing parenchyma. For illustration, images were acquired with a protocol that sacrifices spatial resolution during the first minute post-contrast injection, and uses higher-than-usual SENSE acceleration factors, to acquire full bilateral, fat-suppressed breast images with temporal resolution ranging between 6.2 seconds and 9.9 seconds. Following an initial 60 seconds of fast imaging, subsequent images were acquired using a standard clinical protocol with high-spatial resolution, intermediate SENSE factors, and low temporal resolution. This approach provided detailed information regarding the early kinetics in the breast, while later high-spatial resolution acquisitions allowed assessment of the morphology of small lesions. The results provide new information regarding contrast medium uptake during the first minute after injection, and demonstrate the potential diagnostic utility of high-temporal resolution imaging. In addition, these results are useful for evaluating acceleration methods, and suggest new approaches to fast data acquisition and quantitative analysis.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a processor cause a computing device to:
    read image data, wherein the image data is constructed from data generated by a magnetic resonance imaging (MRI) machine of a subject;
    present a representation computed from the read image data on a display device;
    receive baseline artery locations identified within the presented representation that are associated with a baseline artery;
    determine a first time-of-arrival (TOA) of contrast medium into the baseline artery using the received baseline artery locations and the read image data; and
    for a plurality of locations within the read image data excluding the baseline artery locations,
        determine a second TOA of the contrast medium into a respective location relative to the determined first TOA using the read image data; and
        store the determined second TOA in association with the respective location to assist in lesion identification for the subject.

2. The non-transitory computer-readable medium of claim 1, wherein the representation is maximum intensity projection data computed from the read image data.

3. The non-transitory computer-readable medium of claim 2, wherein the maximum intensity projection data is computed from gradient image data computed as a difference between data associated with successive images included in the read image data.

4. The non-transitory computer-readable medium of claim 3, wherein the data associated with the successive images is computed by computing baseline image data captured prior to injection of the contrast medium and subtracting the computed baseline image data from the read image data associated with the successive images.

5. The non-transitory computer-readable medium of claim 1, wherein each baseline artery location of the baseline artery locations is identified in three-dimensions.

6. The non-transitory computer-readable medium of claim 1, wherein each baseline artery location of the baseline artery locations is identified in two-dimensions.

7. The non-transitory computer-readable medium of claim 1, wherein the data generated by the MM machine includes a first plurality of acquisitions and a second plurality of acquisitions, wherein the first plurality of acquisitions have a higher temporal resolution than the second plurality of acquisitions and the second plurality of acquisitions have a higher spatial resolution than the first plurality of acquisitions, wherein the first plurality of acquisitions and the second plurality of acquisitions are obtained after injection of the contrast medium into the subject.

8. The non-transitory computer-readable medium of claim 7, wherein the first TOA is determined using a first portion of the read image data associated with the first plurality of acquisitions.

9. The non-transitory computer-readable medium of claim 7, wherein the second TOA is determined using the first portion of the read image data associated with the first plurality of acquisitions.

10. The non-transitory computer-readable medium of claim 7, wherein the second TOA is determined by fitting a curve to signal data associated with the respective location in each acquisition of the first plurality of acquisitions.

11. The non-transitory computer-readable medium of claim 10, wherein the curve is fit to signal data associated with the respective location in each acquisition of the first plurality of acquisitions after the determined first TOA.

12. The non-transitory computer-readable medium of claim 11, wherein the second TOA is further determined by evaluating a time at which the fit curve achieves a predefined signal enhancement value above a baseline signal value.

13. The non-transitory computer-readable medium of claim 7, wherein the second TOA is determined by successively applying a filter condition to signal data associated with the respective location in the first plurality of acquisitions.

14. The non-transitory computer-readable medium of claim 13, wherein, when the applied filter condition is satisfied, a first signal value of a current acquisition of the first plurality of acquisitions and a second signal value of a previous acquisition of the first plurality of acquisitions are interpolated to determine an intermediate TOA, wherein the second TOA is determined by subtracting the determined first TOA from the determined intermediate TOA.

15. The non-transitory computer-readable medium of claim 13, wherein the filter condition compares a signal enhancement value computed using the signal data to a predefined signal enhancement value.

16. The non-transitory computer-readable medium of claim 15, wherein the signal enhancement value is computed relative to an average value computed for a third plurality of acquisitions, wherein the third plurality of acquisitions are obtained before injection of the contrast medium into the subject.

17. The non-transitory computer-readable medium of claim 13, wherein the filter condition compares a deviation value computed using the signal data to a predefined deviation value.

18. The non-transitory computer-readable medium of claim 17, wherein the deviation value is a number of standard deviations, wherein the number of standard deviations is computed using a standard deviation computed between a third plurality of acquisitions, wherein the third plurality of acquisitions are obtained before injection of the contrast medium into the subject.

19. A computing device comprising:
a processor; and
a non-transitory computer-readable medium operably coupled to the processor, the computer-readable medium having computer-readable instructions stored thereon that, when executed by the processor, cause the computing device to
read image data, wherein the image data is constructed from data generated by a magnetic resonance imaging (MRI) machine of a subject;
present a representation computed from the read image data on a display device;
receive baseline artery locations identified within the presented representation that are associated with a baseline artery;
determine a first time-of-arrival (TOA) of contrast medium into the baseline artery using the received baseline artery locations and the read image data; and
for a plurality of locations within the read image data excluding the baseline artery locations,
determine a second TOA of the contrast medium into a respective location relative to the determined first TOA using the read image data; and
store the determined second TOA in association with the respective location to assist in lesion identification for the subject.

20. A method of determining a contrast medium uptake time using magnetic resonance imaging data, the method comprising:
reading, by a computing device, image data, wherein the image data is constructed from data generated by a magnetic resonance imaging (MM) machine of a subject;
presenting, by the computing device, a representation computed from the read image data on a display device;
receiving, by the computing device, baseline artery locations identified within the presented representation that are associated with a baseline artery;
determining, by the computing device, a first time-of-arrival (TOA) of contrast medium into the baseline artery using the received baseline artery locations and the read image data; and
for a plurality of locations within the read image data excluding the baseline artery locations,
determining, by the computing device, a second TOA of the contrast medium into a respective location relative to the determined first TOA using the read image data; and
storing, by the computing device, the determined second TOA in association with the respective location to assist in lesion identification for the subject.

* * * * *